(12) United States Patent
Kanai et al.

(10) Patent No.: US 6,988,087 B2
(45) Date of Patent: Jan. 17, 2006

(54) SERVICE METHOD OF A RENTAL STORAGE AND A RENTAL STORAGE SYSTEM

(75) Inventors: Hiroki Kanai, Higashiyamato (JP); Tatsumi Uchigiri, Kodaira (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 526 days.

(21) Appl. No.: 09/919,930

(22) Filed: Aug. 2, 2001

(65) Prior Publication Data

US 2002/0152181 A1 Oct. 17, 2002

(30) Foreign Application Priority Data

Apr. 16, 2001 (JP) ............................. 2001-116435

(51) Int. Cl.
*G06F 17/60* (2006.01)
(52) U.S. Cl. ......................................... 705/80; 707/200
(58) Field of Classification Search ................ 705/5–6, 705/22, 28, 50–53, 80; 707/200–206; 455/405–409; 340/5
See application file for complete search history.

(56) References Cited

U.S. PATENT DOCUMENTS

| | | | | |
|---|---|---|---|---|
| 5,131,087 A | * | 7/1992 | Warr | 711/113 |
| 5,276,867 A | * | 1/1994 | Kenley et al. | 707/204 |
| 5,410,598 A | * | 4/1995 | Shear | 705/53 |
| 5,940,838 A | * | 8/1999 | Schmuck et al. | 707/200 |
| 5,946,660 A | * | 8/1999 | McCarty et al. | 705/5 |
| 6,263,350 B1 | * | 7/2001 | Wollrath et al. | 707/206 |
| 6,370,580 B2 | * | 4/2002 | Kriegsman | 709/226 |
| 6,427,152 B1 | * | 7/2002 | Mummert et al. | 707/102 |
| 6,516,348 B1 | * | 2/2003 | MacFarlane et al. | 709/224 |

FOREIGN PATENT DOCUMENTS

JP 03280652 A * 12/1991
JP 05-324358 5/1992

OTHER PUBLICATIONS

Thomas, "Facilities Planning, Evaluation and Acquisition for Smaller Corporations. (corporate space needs)", Inc., v6, p111(11), Sep. 1984, ISSN: 0162-8968.*

* cited by examiner

*Primary Examiner*—Mary Cheung
(74) *Attorney, Agent, or Firm*—Reed Smith LLP; Stanley P. Fisher, Esq.; Juan Carlos A. Marquez, Esq.

(57) ABSTRACT

The present invention provides a service method of rental storage, which, when a rental storage service provider provides a rental storage for rental storage service users, allows ideal use of storages in correspondence with the billing charge to the users by proposing the most optimum contract options to the users, and which allows suppressing the management cost of the users.

The service method of rental storage through network connection, the storage provider will estimate the future usage of storage based on the history of usage of storage by the rental storage service user to report the estimation to the user. The rental storage service user will update the contract by expanding or reducing the amount of data usage so as to receive the most optimum contract conditions of rental storage service.

7 Claims, 34 Drawing Sheets

FIG. 4

93 : DATA ACCESS FILE

| STORAGE AREA | NAME OF DATA | AMOUNT OF DATA | ACCESS FREQUENCY | USER IDENQUENCY |
|---|---|---|---|---|
| 1 | 1 | 300GB | 100 TIMES | A |
| 1 | 2 | 200GB | 100 TIMES | B |
| 1 | 3 | 200GB | 100 TIMES | C |
| 2 | 4 | 200GB | 10 TIMES | D |
| ⋮ | ⋮ | ⋮ | ⋮ | ⋮ |

FIG. 5

86 : USER MANAGEMENT FILE

| USER IDENTIFIER | BILLING METHOD | AMOUNT CON-TRACTED | ESTIMATION CONTRACT | BILLING PERIOD | AMOUNT TO BE REPORTED | AMOUNT ESTIMATED |
|---|---|---|---|---|---|---|
| A | FIXED | 300GB | YES | MONTHLY | 200GB | 300GB |
| B | FIXED | 200GB | NO | MONTHLY | 200GB | 500GB |
| C | SPECIFIC | 30000 YEN | YES | MONTHLY | 30000 YEN | 30000 YEN |
| D | SPECIFIC | 20000 YEN | NO | WEEKLY | 10000 YEN | 10000 YEN |
| ⋮ | ⋮ | ⋮ | ⋮ | ⋮ | ⋮ | ⋮ |

FIG. 6

87 : HISTORY DATA FILE

| USER IDENTIFIER | DATA | STORAGE AREA | NAME OF DATA | AMOUNT OF DATA |
|---|---|---|---|---|
| A | 2000/01/1 | 1 | 1 | 100GB |
| A | 2000/01/2 | 1 | 1 | 100GB |
| A | 2000/01/3 | 1 | 1 | 110GB |
| A | 2000/01/4 | 1 | 1 | 115GB |
| ⋮ | ⋮ | ⋮ | ⋮ | ⋮ |

FIG. 7

88 : ESTIMATION FILE

| USER IDENTIFIER | APPROXIMATE FORMULA | DATA ESTIMATION FOR NEXT BILLING DATA | DATE THAT CONTRACTED STORAGE BECOMES FULL | DATE THAT AMOUNT GAINED THE NOTIFICATION AMOUNT |
|---|---|---|---|---|
| A | D=aT+b | 300GB | 2001/02/15 | 2001/02/10 |
| B | D=cT+d | 500GB | 2001/12/07 | 2001/12/07 |
| C | D=eT+g | 300GB | 2001/03/20 | 2001/02/15 |
| D | D=hT+i | 200GB | 2001/07/12 | 2001/05/03 |
| ⋮ | ⋮ | ⋮ | ⋮ | ⋮ |

*FIG. 24*

812: DATA REDUCTION PROPOSITION FILE

| CHECK NUMBER | USER IDEN-TIFIER | STOR-AGE AREA | NAME OF DATA | AMOUNT OF DATA | ACCESS FRE-QUENCY | NON-DELETION FLAG | DELETION PRO-POSITION FLAG | SUM OF REDUC-TION |
|---|---|---|---|---|---|---|---|---|
| 1 | A | 1 | 1 | 300GB | 10 TIMES | NON-DELETION | NON-DELETION | 0GB |
| 2 | A | 1 | 2 | 100GB | 20 TIMES | DELETION | DELETION | 100GB |
| 3 | A | 1 | 3 | 200GB | 50 TIMES | DELETION | DELETION | 300GB |
| 4 | A | 2 | 4 | 200GB | 100 TIMES | DELETION | NON-DELETION | 300GB |
| ⋮ | ⋮ | ⋮ | ⋮ | ⋮ | ⋮ | ⋮ | ⋮ | ⋮ |

SERVICE METHOD OF A RENTAL STORAGE AND A RENTAL STORAGE SYSTEM

BACKGROUND OF THE INVENTION

1. Field of the Invention

The present invention relates to a service method of a rental storage and a rental storage system, and more particularly to a service method of a rental storage and a rental storage system, which may propose reasonable contract conditions conforming to the actual usage of storages by the storage users from the storage provider side at the time of renting storages such as disk subsystems to users in order to reduce costs applied to the storage users.

2. Description of the Prior Art

The amount of information traffic, represented by the explosive spread of internet communication, used by users in the modern computer environment in recent year has been significantly increased, and is still increasing. The amount of data stored in the storage thereby is increasing accordingly, resulting in the increase of management cost of the growing accumulated data. The retrenchment of management cost is thus one of mandatory problems.

Under the context as have been described above, a noticeable service is emerging, as a new aspect of usage of storage represented by the disk subsystem by a storage service provider (referred to as SSP herein below), for providing rental storages for users. Users had to provide by themselves any storage to store data, by for example purchasing. The users were responsible to the maintenance of storage. On the other hand, when using the rental service of storage space provided by the SSP, users do not need to prepare any storage devices, but do hire some storage space at the SSP site at a charge, according to the contract made. As a result users will be released from the burden of maintenance of storages or extension project, thereby will have less responsibility of administration. However, when using such services, although users have not to pay for purchasing any hardware resources for the storages, users will have to pay much, in correspondence with the amount of data if they use more, since in most cases the SSP charges users for the used amount of data.

In conventional management method of data in most popular operating systems such as Unix, it is well known that the actual usage of data may be recognized by the count of issued commands. In some operating systems used in the personal computers, the history of the usage of data may be displayed.

Now referring to FIG. 34, there is shown a typical example of display of usage of storage in the past according to the Prior Art.

FIG. 34 is a schematic chart illustratively indicative of displaying the usage of data record in accordance with the Prior Art.

In the Prior Art, the statistical summary of the past usage of data is displayed, however the estimation of usage of data in the figure based on the past usage of data has not been implemented.

As another example of Prior Art, a performance estimation can be cited, which performs an estimation with respect to a fluctuating environment. This estimation of performance is used when reconfiguring a computer system, without and before actually rearranging the components. An exemplary performance estimation technique of the Prior Art is disclosed for example in the Japanese Published Unexamined Patent Application No. 324358/1993.

The Prior Art cited above describes a rental service of storage as a method for reducing the burden of data administration by the users. When using this service, users will be charged according to the usage of data, so that the users will need to acknowledge the current usage status. Thus this arises a problem of increasing the burden of user, resulting in the increased management cost.

The data management method of operating systems in accordance with the Prior Art allows monitoring the history of data usage in the past, however the estimation of future data usage based thereon is not described. The users therefore may recognize the current and past data usage while the estimation of data usage in the future will be neither disclosed nor solved, the users thus will have a problem of increased burden of data management, because of increased management cost of data usage caused by monitoring the fluctuating amount of data usage all the time in order to have an opportunity of considering the addition of storage capacity if needed. This may not solve the problem of increased cost.

Technology disclosed in the Japanese Published Unexamined Patent Application No. 324358/1993 is embodied by a performance estimation apparatus for estimating the change of performance due to the fluctuation of jobs fed to the computer system and the alteration of system configuration. However this technology does not state about the estimation of the changing usage of data.

The SSP that provides rental storages to the users, have required to manage a huge amount of data for the users and therefore the burden of administration and the management cost of storage have been considerable.

BRIEF SUMMARY OF THE INVENTION

The present invention has been made in view of the above circumstances and has an object to overcome the above problems and to provide a service method of a rental storage and a rental storage system, which allows users to use a rental storage space ideal for the charge thereof by proposing the optimum contract conditions of the users based on the history of storage usage when the users uses the rental storage space provided by an SSP, as well as allows users to decrease the management cost.

The present invention also provides a service method of a rental storage which allows decreasing the administration cost of rental storages for the SSP that provides the rental service.

To achieve the objects and in accordance with the purpose of the invention, as embodied and broadly described herein, this invention comprises a service method of a rental storage, in which a rental storage user uses the rental storage provided by a storage provider on a network and the storage user and the storage provider communicate with respect to the rental storage service, comprising the steps of providing the estimation of future storage usage of the user by the rental storage service provider based on the history of storage usage of the user; and reporting the estimation to the storage user.

The storage user accordingly may recognize the fluctuation of data usage easier than ever to create a usage project of the rental storage space. The budget for the rental storage may be promptly indicated to allow the user to have the burden of rental storage management significantly decreased.

In accordance with the method of rental storage service above, the rental storage service provider and the rental storage service user will make a contract on the storage usage, the rental storage service user will decide the contract conditions based on the rental storage contract, the rental storage service user will use the storage provided by the rental storage service provider, the rental storage service provider will bill the user on the rental storage, the rental storage service provider will reconfigure the contract conditions by reporting the history of data storage usage in the past and the estimated usage of storage in the future to the rental storage service user at the time when the rental storage service user will pay the charge of the storage service.

Accordingly, the rental storage service user will allow optimizing the contracted capacity of data storage when selecting the fixed charge option; the rental storage service user will allow readily make a budget project of rental storage service when selecting the specific charge option. In both cases the management of rental storage service by the rental storage service user will be easier.

As an aspect of the service method of a rental storage service in accordance with the present invention, when the contracted conditions based on the rental storage service contract between the rental storage service provider and the rental storage service user specifies a floating billing charge in proportion to the contracted data usage of the storage used during the contracted period, the rental storage service provider will determine the charge based on the estimation to report the charge to the rental storage service user.

The service method of a rental storage service described above may include the steps of reporting in advance the maximum charge limit payable by the user from the rental storage service user to the rental storage service provider, and reporting the time at which the billing charge will reach to the maximum payable limit from the rental storage service provider to the rental storage service user.

The service method of a rental storage service described above may further include the steps of estimating by the rental storage service provider the storage service usage in the future based on the history of past storage service usage of the rental storage service user and reporting the history of storage usage and the estimation to the rental storage service user so as to perform the reporting step to the rental storage service user at the predetermined moment.

In accordance with the service method of a rental storage service described above, when the contracted conditions based on the rental storage service contract between the rental storage service provider and the rental storage service user specifies a fixed charge in correspondence to the predetermined contracted data usage of the storage for the contracted period, the moment of report is preferably to be at the time when the data usage of the rental storage service user exceeds the contracted capacity of data of predetermined storage.

In accordance with the service method of a rental storage service in accordance with the present invention, the moment of report is preferably to be at the time when the data capacity reaches an amount predefined by the rental storage service user so as to report that the data usage reaches the predetermined capacity.

As another aspect of the service method of a rental storage service in accordance with the present invention, when the contracted conditions based on the rental storage service contract between the rental storage service provider and the rental storage service user specifies a floating billing charge in proportion to the contracted data usage of the storage used during the contracted period, the method may comprise the steps of estimating by the rental storage service provider the storage usage in the future of the rental storage service user based on the history of rental storage service usage by the user, reporting by the rental storage service provider the history of rental storage service usage and the estimation to the rental storage service user, and configuring a target charge to be reported when the billing charge reaches that amount, such that the reporting step to the rental storage service user will be performed at the time when the billing charge to the rental storage service user reaches to the predefined amount of charge.

As a preferred embodiment of the rental storage service system in accordance with the present invention, the invention comprises a rental storage service system in which the rental storage service users uses the rental storage provided by the rental storage service provider through the network and the storage provider communicate with respect to the rental storage service, the system comprising user information processing unit for configuring the information about the rental storage service user;

data aggregation unit for aggregating the usage of storage by the rental storage service user;

usage estimation unit for estimating the data usage by the rental storage service user;

billing unit for billing the charge to the rental storage service user;

reporting unit for reporting any necessary information to the rental storage service user; and data access processing unit for storage data access; wherein the user information processing unit recording the configuration into a user management file;

the data aggregation unit recording the history of data usage of the rental storage service in a data record file;

the usage estimation unit recording the data usage based on the estimation into the data estimation file;

the data access controller unit recording the data access information of the rental storage.

In the rental storage service system as have been described above, the reporting unit may have a means for displaying the history of storage usage aggregated by the data usage aggregation unit together with the estimated usage of storage analyzed by the data estimation unit on the same single display screen.

Furthermore, in the rental storage service system as have been described above, the reporting unit may have a means for displaying the charge record of the past extracted by the data usage aggregation unit and the charge processing unit together with the estimated billing charge in the future determined by the data aggregation unit and the billing charge processing unit on the same single display screen.

In addition, in the rental storage service system as have been described above, the reporting unit may have a means for displaying a list of suggested options of reduction of data capacity used by the rental storage service user, together with the input fields for configuring the data reduction of storage used by the rental storage service user based on the suggested options, on a same single display screen.

As another preferred embodiment of the rental storage service system in accordance with the present invention, the rental storage service system includes a server and disk storage subsystems, the disk subsystems including the user information processing unit, the data aggregation unit, the data estimation unit, and the billing charge processing unit so as to perform an estimation of storage usage in each disk subsystem to allow the server to integrate estimation results to ultimately conclude the estimation.

As still another preferred embodiment of the rental storage service system in accordance with the present invention, the rental storage service system includes a server and disk storage subsystems, the server including the user information processing unit, the data aggregation unit, the data estimation unit, and the billing charge processing unit so as to perform on the server side an estimation of usage data based on the usage of storage reported from the disk subsystems.

In this manner, the administrator(s) of the storage system may be allowed to easily estimate the course of amount of stored data in the whole system or in the whole SSP, resulting in a simpler data management by the system administrator(s). The present invention also permits a project of extending the additional storage devices in the future to be designed in a straightforward fashion.

Preferably, the estimated value of data storage usage after a predetermined period of time will be reported to the administrator when the value exceeds to a storable capacity of storage data of the owned storage system.

More specifically, in the rental storage service system in accordance with the present invention, the administrator(s) of the rental storage service system will be notified when the used storage capacity estimated by the data usage estimation unit exceeds to a predetermined quota level.

In this manner, the administrator(s) of the storage system may need not to monitor the free capacity of the storage on a frequent and regular basis so as to alleviate the burden of data management task of the administrator(s).

The above and further objects and novel features of the present invention will more fully appear from following detailed description when the same is read in connection with the accompanying drawings. It is to be expressly understood, however, that the drawings are for the purpose of illustration only and not intended as a definition of the limits of the present invention.

BRIEF DESCRIPTION OF SEVERAL VIEWS OF DRAWING

The accompanying drawings, which are incorporated in and constitute a part of this specification illustrate an embodiment of the invention and, together with the description, serve to explain the objects, advantages and principles of the invention. In the drawings, FIG. 1 is a schematic diagram illustratively indicative of a relationship between a rental storage service user and a rental storage service provider in the service method of rental storage in accordance with the present invention;

FIG. 4 is a table illustratively indicative of exemplary contents of a data access file 93;

FIG. 5 is a table illustratively indicative of exemplary contents of a user management file 86;

FIG. 6 is a table illustratively indicative of exemplary contents of a history data file 87;

FIG. 7 is a table illustratively indicative of exemplary contents of an estimation file 88;

FIG. 24 is a table illustratively indicative of typical contents of a data reduction proposition file 812;

DETAILED DESCRIPTION OF THE PREFERRED EMBODIMENTS

A detailed description of some typical preferred embodiments embodying the present invention will now be given referring to the accompanying drawings, in particular to FIG. 1 through FIG. 33.

It is to be understood that the present invention is not to be limited to the details herein given but may be modified within the scope of the appended claims.

[Overview of the Inventive Service Method of Rental Storage]

Now referring to FIG. 1 and FIG. 2, the overview of the service method of rental storage system in accordance with the present invention will be described in greater details below.

Figure 1:
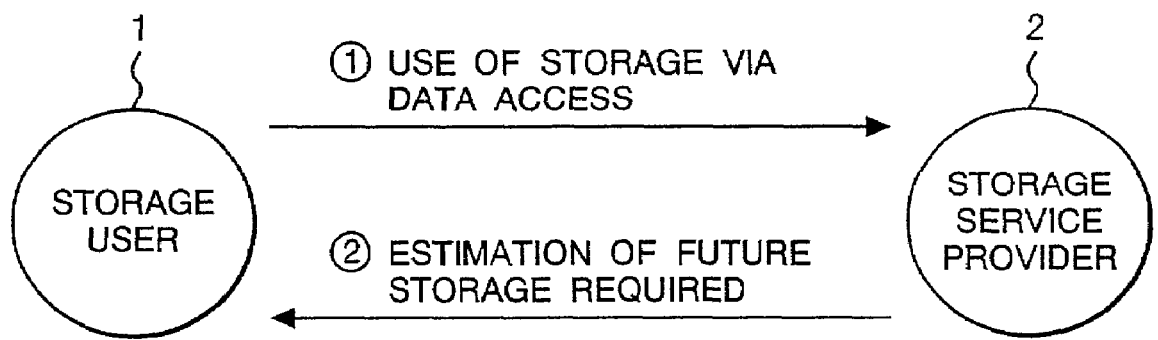

FIG. 1 is a schematic diagram illustratively indicative of a relationship between a rental storage service user and a rental storage service provider in the service method of rental storage in accordance with the present invention.

Figure 2:
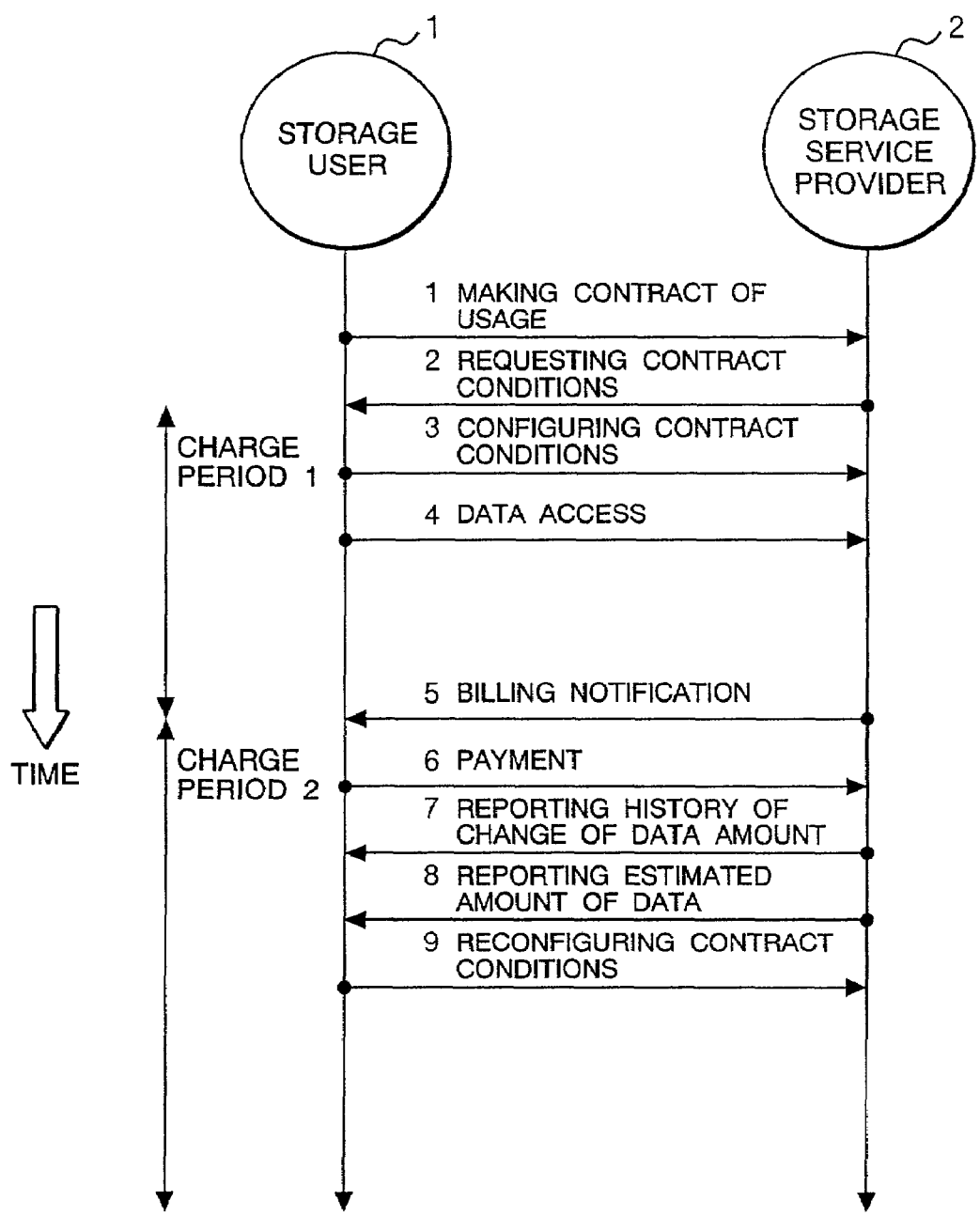
FIG. 2 is a schematic diagram illustratively indicative of a chronological sequence of procedure communicated between the rental storage service user and the rental storage service provider.

FIG. 2 is a schematic diagram illustratively indicative of a chronological sequence of procedure communicated between the rental storage service user and the rental storage service provider.

As shown in FIG. 1, the rental storage service user 1 will store and refer to data in the rental storage system provided by the rental storage service provider 2. More specifically, the rental storage service user 1 is a user of the service provided by the rental storage service provider 2 (in the following description, the term "user" will be used as synonym of and referred to as the "rental storage service user 1" unless otherwise specified).

In the conventional systems, the rental storage service provider 2 may provide the rental storage service and receive the charge billed to the user in respect of the usage of storage by the rental storage service user 1. The present invention, however, may provide a novel service system, as shown in FIG. 2, in which the rental storage service provider 2 will estimate the future usage of storage data based on the history record of the usage data stored in the storage device(s) to report to the rental storage service user 1 the estimation.

In the following description the present invention will be described along with the chronological sequence of procedure performed between the rental storage service user 1 and the rental storage service provider 2 in this service model, with reference made to FIG. 2. The rental storage service user 1 will sign up a contract of the rental storage service with the rental storage service provider 2 prior to use the storage service (step 1). In general, a usage contract will be made between the rental storage service user 1 and the rental storage service provider 2 prior to providing and using the rental storage. In step 1, typical procedure including such as the name of the rental storage service user 1 and the billing method will be filled prior to selecting more specific contact options.

Then the SSP 2 will ask the user more specific contract contents or options with respect to the usage of the rental storage service (step 2). The rental storage service user 1 will decide the optional contents of the contract, including such as the billing method, the billing interval, the storage capacity desired by the user and the like (step 3).

As the billing methods there are options such as fixed charge and floating (specific) charge. The fixed charge system is a billing method for charging the user on the contracted capacity of storage, when the maximum capacity of data storage is preconfigured as the contracted storage capacity. In general, the user will use the storage within the limit of contracted capacity. The floating (specific) charge system is another billing method for charging the user in proportion to the amount of data usage. The billing interval is the period of time for which the user will pay the cost of rental storage service. The contracted capacity may depend on the billing method. If the fixed charge is selected, then the capacity will be equal to the maximum data usage. In the floating charge system the capacity will be equal to the sum of charge per a unit data quantity.

Next, the rental storage service user 1 will store and refer to the data using the rental storage service, or will access data (step 4).

Then, the rental storage service provider 2 will notify the rental storage service user 1 of the charge for the storage usage for a billing period based on the billing interval selected in the contract options (step 5). The rental storage service user 1 in turn will pay the amount of charge for the corresponding storage usage (step 6).

Thereafter, the rental storage service provider 2 will report the transitive course of actual usage of storage data by the rental storage service user 1 (step 7). In addition, the rental storage service provider 2 will report the estimation of data usage in the future for the rental storage service user 1 (step 8). The actual usage and expected usage in step 7 and 8 respectively may be reported at the same time.

The rental storage service user 1, upon reception of the report, may alter the contract options if needed, by referring to the estimation. The rental storage service user 1 may reconfigure the optional contents of contract with a new options (step 9).

[First Embodiment]

First preferred embodiment of the present invention will be described in greater details with reference to FIG. 3 through FIG. 11 herein below.

(1) System Architecture of the Rental Storage Service System

Figure 3:
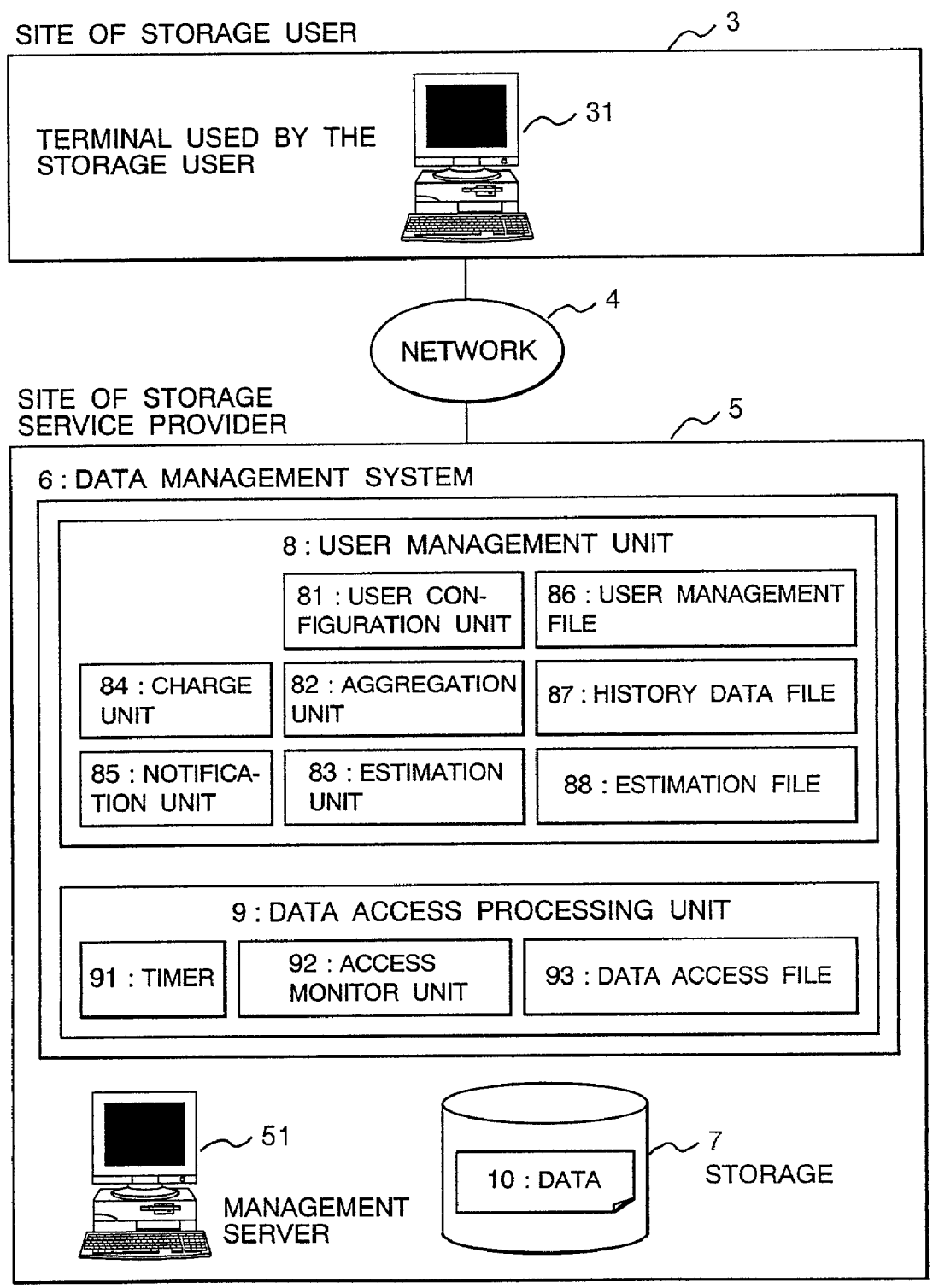
FIG. 3 is a schematic block diagram illustratively indicative of a system architecture of the rental storage service system in accordance with first preferred embodiment of the present invention.

Now the system architecture of the rental storage service system in accordance with the preferred embodiment will be overviewed with reference to FIG. 3.

FIG. 3 is a schematic block diagram illustratively indicative of a system architecture of the rental storage service system in accordance with first preferred embodiment of the present invention.

The system for providing the rental storage service may be in the form of a site of storage user 3 connected to site of storage service provider 5 through a network 4. The network 4 may include the Internet and private line. The site of storage user 3 and site of storage service provider 5 may be housed in a same installation and connected by a LAN.

The site of storage user 3 has a terminal used by the storage user 31. The terminal used by the storage user 31 may be a PC, a workstation, a portable information terminal, or a cellular phone terminal, as long as it incorporates an input device such as a keyboard and a mouse and a display output device such as a display screen.

The site of storage service provider 5 may be formed of a storage 7 for storing the data 10 owned by the user, rental storage service user and the data management system 6 for the data. The storage 7 may be formed of disk storage subsystems of the device type such as RAID (redundant array of inexpensive disks) and NAS (network attached storage; storage devices that can be directly attached to a network; data communication to the outside in file basis), and part thereof may include devices for storing data in a portable medium, such as a tape drive.

The data management system 6 may be formed primarily of a user management unit 8 and a data access processing unit 9. The user management unit 8 includes some units such as a user configuration unit 81, a aggregation unit 82, an estimation unit 83, a charge unit 84, and a notification unit 85, and some files such as user management file 86, a history data file 87, and an estimation file 88. The data access processing unit 9 may be formed primarily of units including a timer 91 and an access monitor unit 92, and of a data access file 93. The timer 91 is provided for invoking at a regular basis the access monitor unit 92.

(II) Details of Data Files

Now referring to FIG. 4 through FIG. 7, the service method of rental storage system in accordance with the preferred embodiment of the present invention will be described in greater details herein below.

FIG. 4 is a table illustratively indicative of exemplary contents of a data access file 93.

FIG. 5 is a table illustratively indicative of exemplary contents of a user management file 86.

FIG. 6 is a table illustratively indicative of exemplary contents of a history data file 87.

FIG. 7 is a table illustratively indicative of exemplary contents of an estimation file 88.

The data access file is a data file for identifying the amount of data in the storage system. The data access file allows the access frequency of data may be investigated. In the present preferred embodiment, as shown in FIG. 4, the data access file includes, for each data record, fields such as storage area, name of data, size of data, access frequency, and user identifier. The storage area field is a filed containing a value indicative of the storage area recognized by the SSP. The storage area may be a storage device basis or virtual data partition basis. The name of data field is a field containing the value indicative of data of minimal logical unit recognized by the storage user. The minimal logical unit may be a logical volume for the RAID, or a file for the NAS. The size of data contains the amount of data indicated by the name of data. The access frequency contains a value indicative of access frequency with respect to the data in question. The user identifier is an identifiable extension of the rental storage service user 1, the user who owns the data.

The user management file is a data file for managing the rental storage service users 1. In the present embodiment, as shown in FIG. 5, the file has fields including the user identifier, the billing method, the contracted capacity, the charge interval, the report limit, and the amount estimated of capacity for each user record.

The user identifier field is a field for storing an identifier for recognizing a user; the identifier is the identical one stored in the user identifier field of the data access file. The billing method field is a field for storing either fixed or floating charge. The contracted capacity field contains the number of capacity in the storage that the rental storage service user 1 is allowed to use; in a fixed charge conditions the value is equal to the storage capacity allowed for the user; in a floating charge conditions the amount of charge per unit of data to be paid by the rental storage service user 1. The estimation contract field contains a value indicating whether or not the rental storage service user 1 has made a contract of estimation. The billing interval field contains a value indicative of the sum charged to the rental storage service user 1 by the rental storage service provider 2; in general this field contains a value indicating a month, a week and so on. The report limit field contains a predetermined value that the rental storage service user 1 will report to the rental storage service provider 2 when this value is reached; the value will be the amount of data in case of fixed charge, and the amount of charge in case of contract charge. The amount estimated of capacity contains a value indicative of amount estimated at a given point of time by the rental storage service provider 2 for the rental storage service user 1. This value may also be the size of data in case of fixed charge, and the amount of charge in case of contract charge.

In the illustrative example, the user illustratively indicative of the user identifier A has an estimated amount of data of 300 GB with the estimation option available. This indicates that the user updated the contract options based on the estimation provided by the rental storage service provider 2. The user A has a contracted amount of data of 300 GB, and configured so as to be reported, prior to approaching the limit, when the amount of data to be reported reaches 200 GB.

The user of the user identifier B has an estimated amount of data of 500 GB with the estimation option unavailable. This user did not update the contract options based on the estimation provided by the rental storage service provider 2. The user B has a contracted amount of data of 200 GB, and configured so as to be reported the amount of data reaches the maximum quantity of 200 GB.

The history data file 87 is a data file for recording at a regular basis the amount of data in the storage used by the rental storage service user 1. In the present embodiment, as shown in FIG. 6, the file has fields of user identifier, date, storage area, and the amount of data for each user record.

The estimation file 88 is a data file for recording the estimation result of the amount of data in the storage that will be used by the rental storage service user 1. In the present embodiment, the file has fields of approximation that may be used for the estimation calculated from the history of past data usage, estimated usage at the next billing date, date at which the data reaches the maximum limit, and date at which the amount of data reaches the notification threshold. The estimated usage at the next billing date is the estimated amount of data that the rental storage service user 1 will possess at the next billing date determined by the billing interval. The date at which the data reaches the maximum limit is the estimated date of storage full based on the usage record of the rental storage service user 1 in the current conditions. The date at which the amount of data reaches the notification threshold is the expected date at which the amount of data may reach to the notification level (quota) that has been defined to be reported by the rental storage service user 1 as shown in FIG. 5.

(III) Detailed Process Sequence of the Rental Storage Service

Now referring to FIG. 8 and FIG. 9 the process sequence of the rental storage service system in accordance with the preferred embodiment of the present invention will be described in greater details below.

Figure 8:
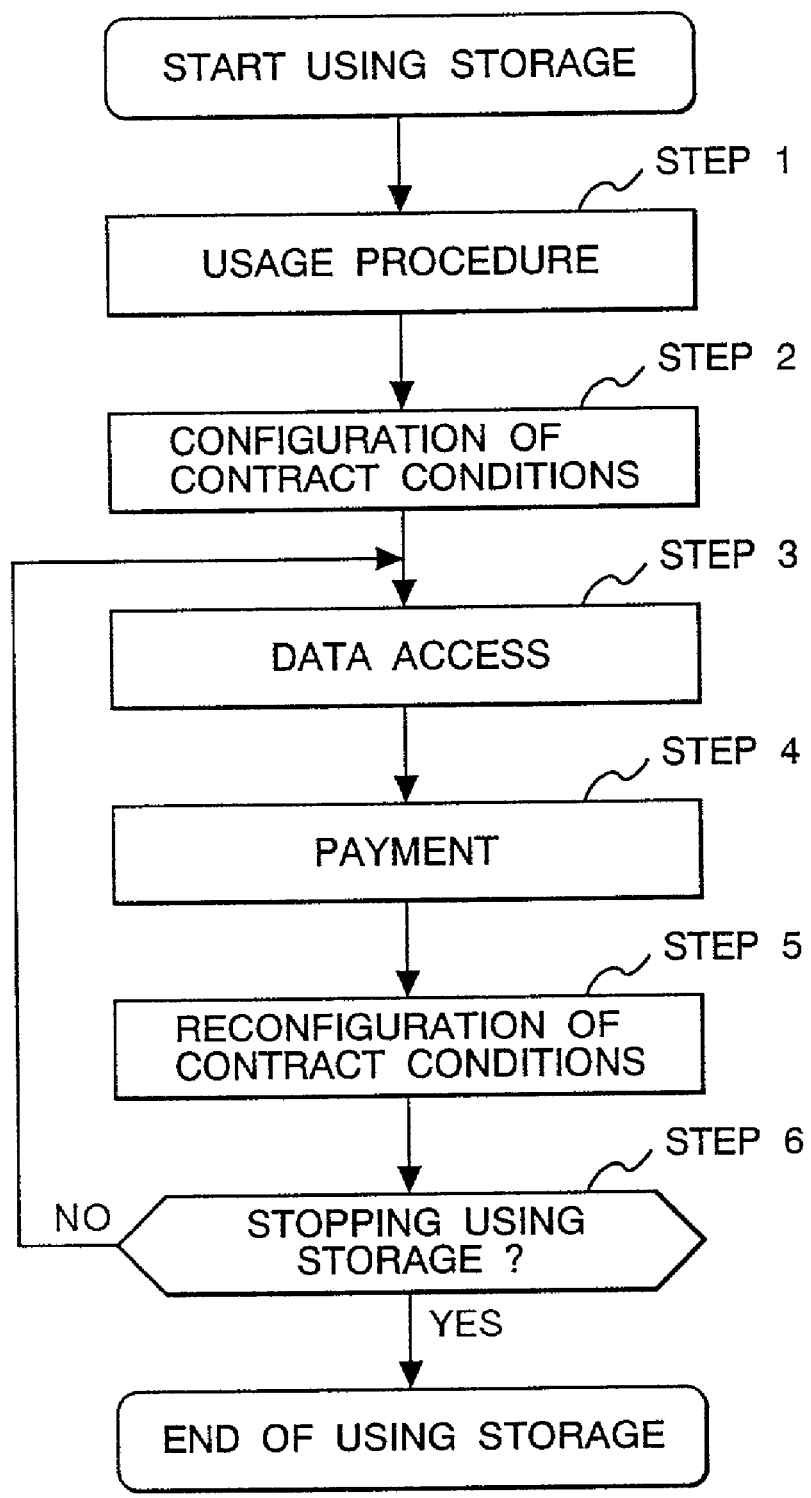
FIG. 8 is a schematic flow chart illustratively indicative of the sequence of rental storage service user 1 side actions.

FIG. 8 is a schematic flow chart illustratively indicative of the sequence of user side actions.

Figure 9:
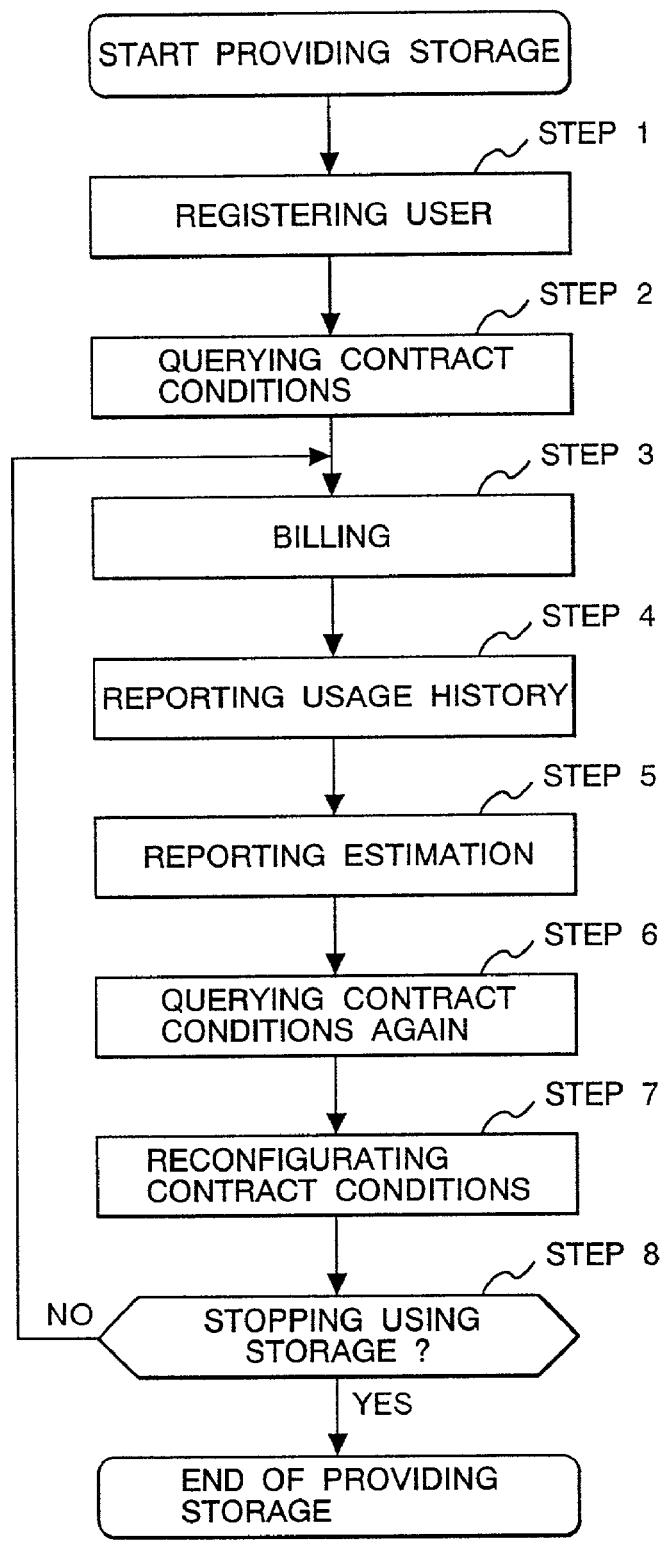
FIG. 9 is a schematic flow chart illustratively indicative of the sequence of rental storage service provider 2 side actions.

FIG. 9 is a schematic flow chart illustratively indicative of the sequence of provider side actions.

The rental storage service user 1 will sign up the rental storage service if desired to use the storage (step 1). The user will be asked from the rental storage service provider 2 after step 1 to set the contract options (step 2). The sign up of storage usage will be completed by the steps 1 and 2 above with the usage conditions according to the contract established, the user then will be able to use the rental storage service. Those steps 1 and 2 may be done from the terminal used by the storage user 31 shown in FIG. 3. Next, the user will perform actually data access once to start using the rental storage service (step 3). At the time of use, the storage will be empty. The rental storage service user 1 will transfer data thereto. When first billing period from the start of use has been passed the user will receive a billing notification from the rental storage service provider 2. The user will pay the charged amount for the storage usage (step 4). Then, by referring to the history of usage record and the estimation of data usage in the next billing period, the user may add or remove contract options if desired to reconfigure the contract conditions (step 5). Then, the user will decide whether or not to stop using the storage (step 6). If the user desires the renewal of the rental storage service contract, then the steps 3 to 6 will be repeated. If the user wishes to stop using the rental storage service, then the contract will be terminated.

At the time when the rental storage service provider 2 provides a rental storage service, the provider will register the user so as to record the sign up contents of the rental storage service user 1 into the user management file 86 (step 1). Then the provider will ask the rental storage service user 1 about the contract options to define the contract conditions (step 2). Then data configured by the rental storage service user 1 as the options will be merged into the user management file 86. Thereafter, the rental storage service user 1 will be able to start accessing data. According to the contract options, the provider will aggregate the data usage in the billing period to report to the rental storage service user 1 thus calculated charge (step 3). Then the provider will report the history of usage to the rental storage service user 1 (step 4), and will estimate the future data transaction based on the usage record to report thus estimated transaction (step 5). Next, the provider will ask the rental storage service user 1 to confirm again the contracted options (step 6). When the rental storage service user 1 rearrange the contract conditions, the rental storage service provider 2 will perform again the configuration of the contract options (step 7).

If the user wishes use the rental storage service, the step 3 to 6 will be iterated. If otherwise the user wishes stop using the rental storage service, then the service contract will be terminated.

(IV) Details of Data Management System 6

Now referring to FIG. 10 through FIG. 15, the process sequence performed by the data management system for implementing the rental storage service in accordance with the present invention will be described in greater details with reference to flow charts depicted in the drawings.

Figure 10:
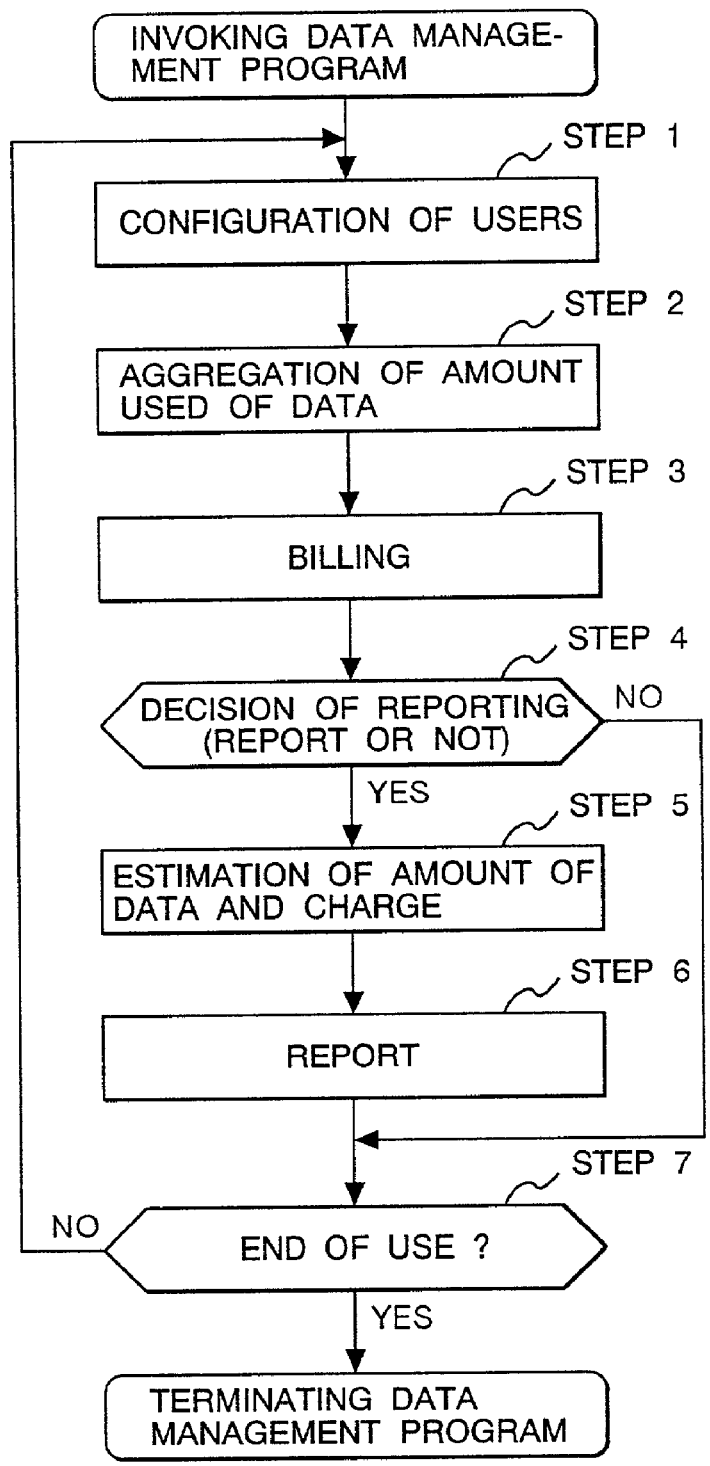
FIG. 10 is a flow chart illustratively indicative of process sequence performed by a data management system.

FIG. 10 is a flow chart illustratively indicative of process sequence performed by a data management system.

Figure 11:
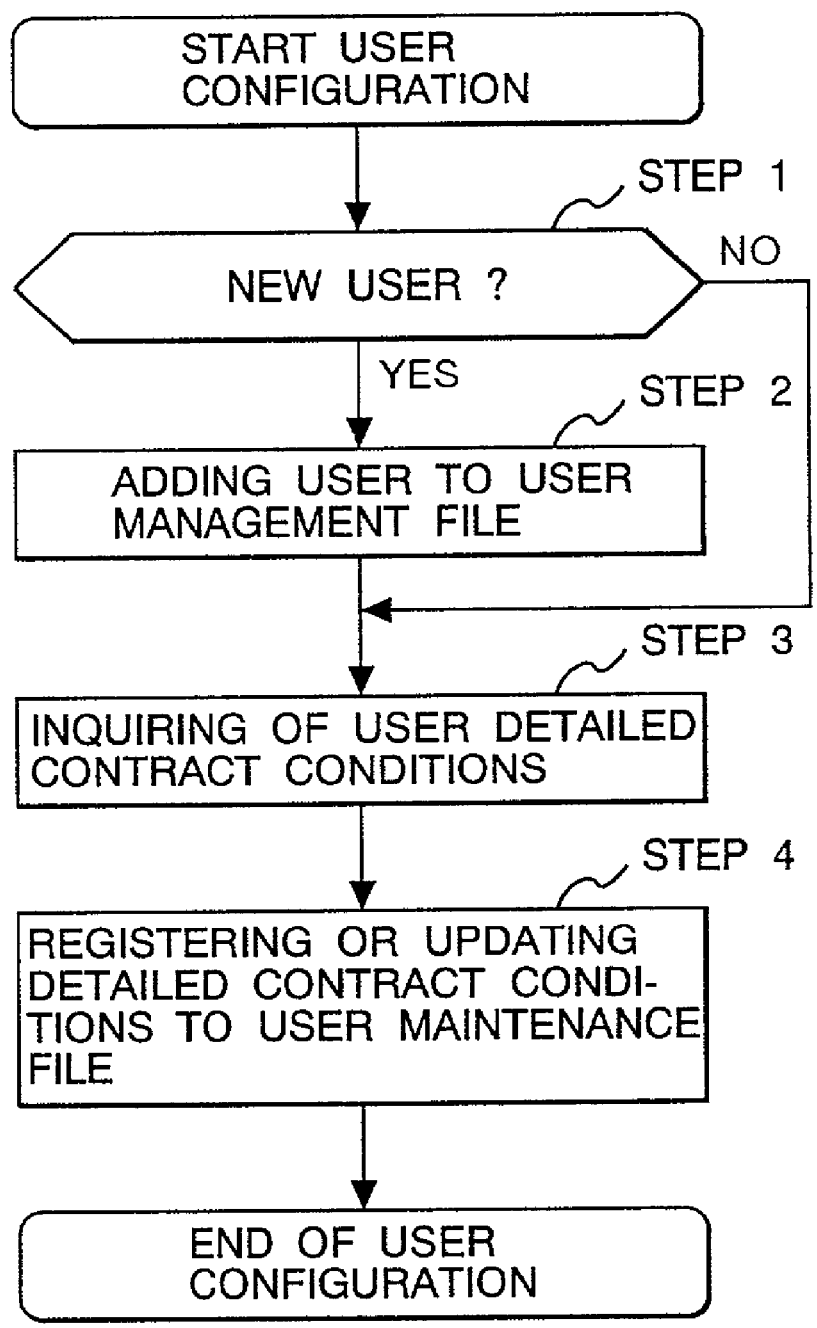
FIG. 11 is a flow chart illustratively indicative of process sequence of user configuration.

FIG. 11 is a flow chart illustratively indicative of process sequence of user configuration.

Figure 12:
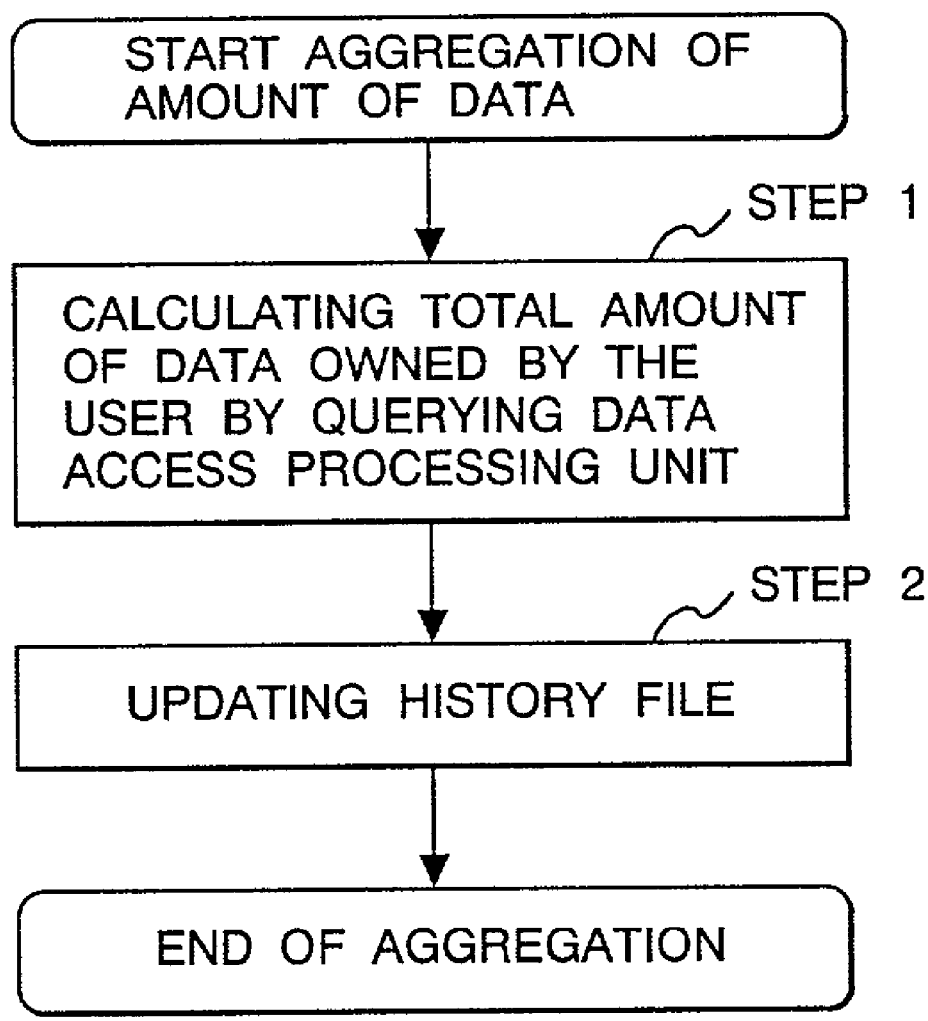
FIG. 12 is a flow chart illustratively indicative of process sequence of usage aggregation.

FIG. 12 is a flow chart illustratively indicative of process sequence of usage aggregation.

Figure 13:
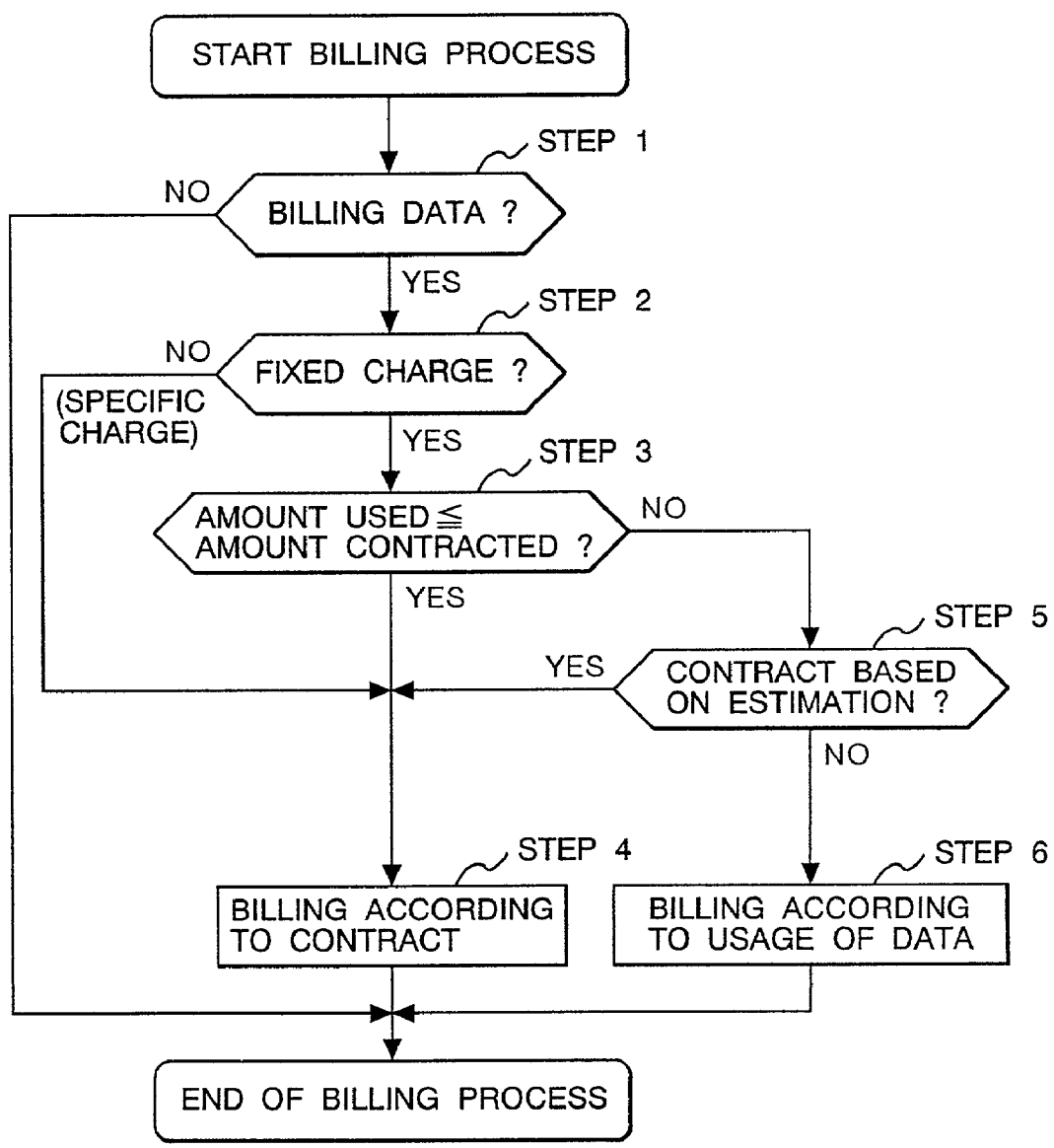
FIG. 13 is a flow chart illustratively indicative of process sequence of billing charge.

FIG. 13 is a flow chart illustratively indicative of process sequence of billing charge.

Figure 14:
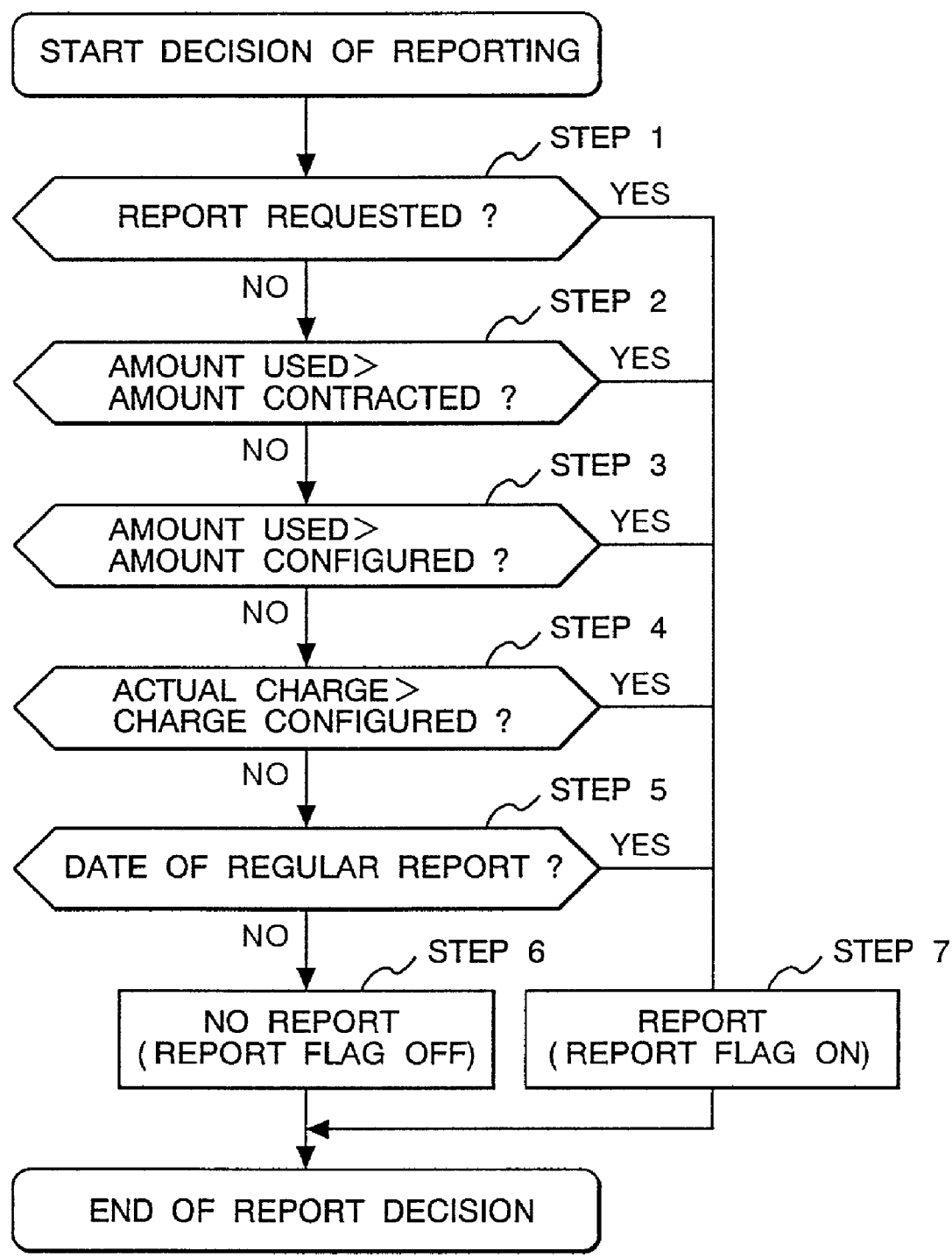
FIG. 14 is a flow chart illustratively indicative of process sequence of report decision.

FIG. 14 is a flow chart illustratively indicative of process sequence of report decision.

Figure 15:
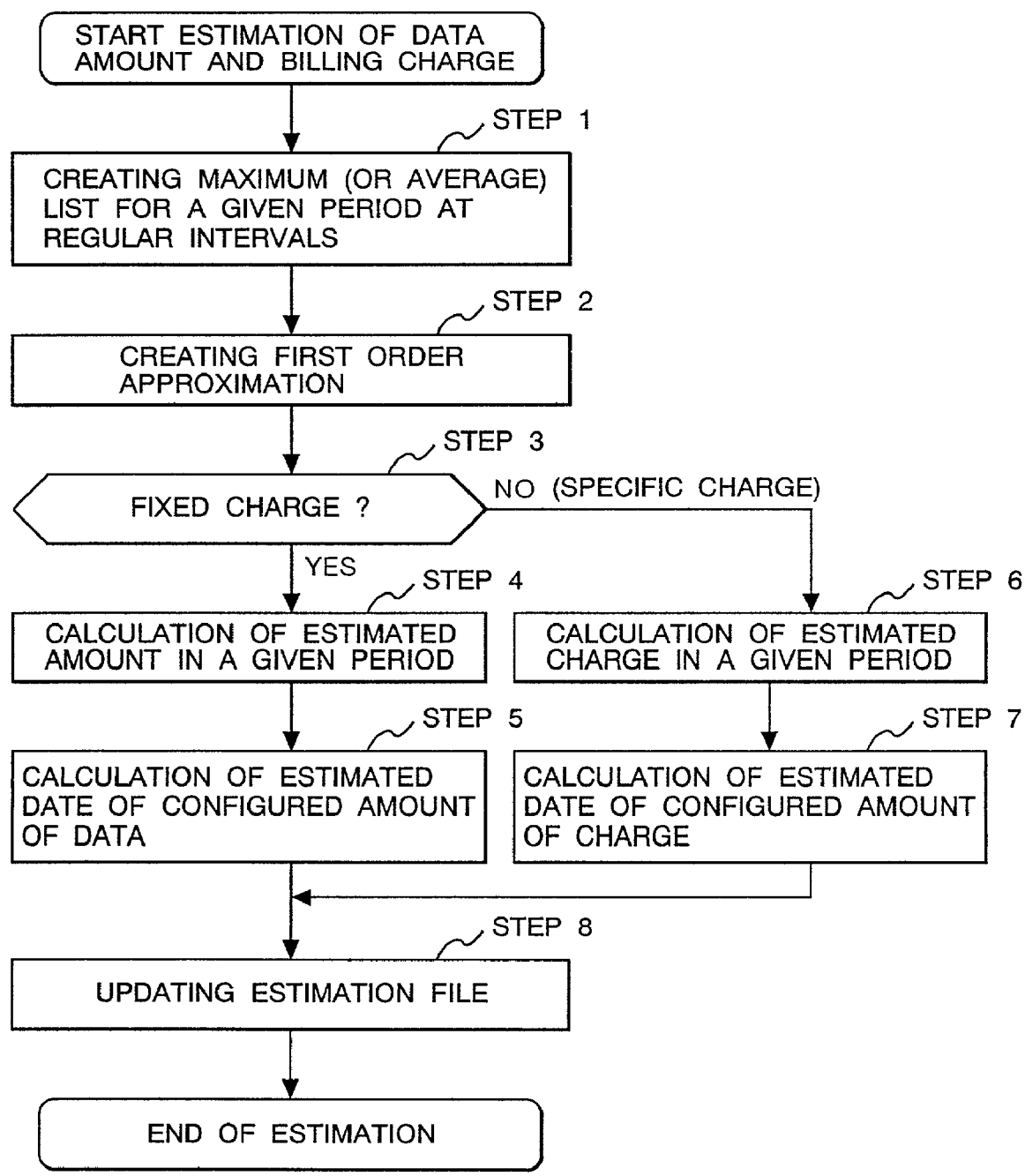
FIG. 15 is a flow chart illustratively indicative of process sequence of estimation of storage data usage and charged usage.

FIG. 15 is a flow chart illustratively indicative of process sequence of estimation of storage data usage and charged usage.

(IV-1) Process Sequence Overview of the Management System

As shown in FIG. 10, the data management program will perform following steps in the order:

the user configuration process (step 1);
the aggregation of the amount of transaction data (step 2);
the billing charge (step 3);
the decision whether reporting or not (step 4);
the estimation of data usage in case in which the estimation will be reported (step 5), if the estimation will not be reported then the process will proceed to step 7;
the report of the transaction history and usage estimation to the rental storage service user (step 6);
finally the determination whether or not the rental storage service user stops using the rental storage service (step 7).

When the user wishes using the service, then the program will start over from the step 1; when the user wishes terminating then the data management program will be terminated.

(IV-2) User Configuration

This process step corresponds to step 1 of FIG. 10.

As shown in FIG. 11, the rental storage service user will be determined whether to be new unregistered user or not (step 1)

In case of new user, then append the user record to the user management file (step 2).

If the user is already registered, then the program will skip step 2 to proceed to step 3.

Next, the program will ask the user to configure detailed options so as to define every items in the user management file (step 3). The detailed contract conditions according to the inquiry will be registered in the user management file or the file will be updated (step 4) to terminate the user configuration.

(IV-3) Data Transaction Aggregation

This process step corresponds to step 2 of FIG. 10.

As shown in FIG. 12, the program will query to the data access processing unit the usage by the data owned by the rental storage service user to calculate the sum of amount of data (step 1). In step 1, if the data is distributed in a plurality of disk drive devices, the program will send queries to every data access processing unit of the disk drives.

Next, the data history file will be updated based on the query result (step 2) to terminate the data aggregation.

(IV-4) Billing Charge Process

This process step corresponds to step 3 of FIG. 10.

As shown in FIG. 13, the program will determine whether or not the billing period has been completed at the present moment of time (step 1). If the billing period is not expired then the program will terminate the process.

If the billing period is expired then the program will determine the billing method. More specifically, there are two options of billing method, fixed charge and floating (specific) charge. The program will determine with which method the user is contracted (step 2).

In case of floating charge, the charge will be corresponding to the contracted conditions (step 4).

In case of fixed charge, the program will determine the amount of data by the rental storage service user is below the contracted limit usage (step 3). If the amount is within the limit, the charge will be according to the contracted conditions (step 4). If the amount exceeds the contracted limit, then the program will determine whether or not the current contracted conditions is based on the estimation (step 5). If the contract is based on the estimation, then the charge will be billed according to the contract conditions even if the amount of data is beyond the contract limit (step 4). If the contract is not based on the estimation, then the charge will be according to the data usage, as specified by the fundamental rules (step 6).

(IV-5) Decision of Reporting

This process step corresponds to step 4 of FIG. 10.

As shown in FIG. 14, the program will determine whether the rental storage service user has requested the report (step 1). If the report is requested, then the rental storage service provider 2 will have to report the usage status of the storage in response to the request by the rental storage service user 1, so that the reporting will be processed by f or example turning on a report flag (step 7).

If the amount of data usage is more than the contracted limit (step 2), the rental storage service user 1 will be reported to be warned (step 7).

The report will also be processed (step 7) in case in which the amount of data usage by the rental storage service user 1 exceeds the reporting threshold (quota) (step 3), or if the amount billed to the rental storage service user 1 exceeds the reporting level (step 3). The reporting quota and the reporting limit refer to the values stored in the field of the amount of charge to be reported in the user management file 86 shown in FIG. 5.

The reporting process will also be executed if a predetermined period of time has been expired (step 7).

In other cases, the reporting will not be processed by for example turning off the reporting flag (step 6).

(IV-6) Estimation of Data Usage and Billing Charge

This process step corresponds to step 4 of FIG. 10.

As shown in FIG. 15, a list of maximum values or mean values will be created for regular intervals for a given period of time in the past (step 1). Step 1 will be performed by referring to the data history file. The predetermined period of time in the past may be the billing interval defined in the contract conditions.

Next, a first order approximation will be generated based on the list (step 2). The detailed calculation of approximation may be applied with the solutions known in the art. The object of the methodology of use of first order approximation is to estimate the amount of data of future usage by approximating the past amount of data with a first order equation along with the time axis, as will be described later with reference to FIG. 17 and FIG. 18.

Then the billing method according to the contract with the rental storage service user 1 will be determined (step 3).

Figure 17:
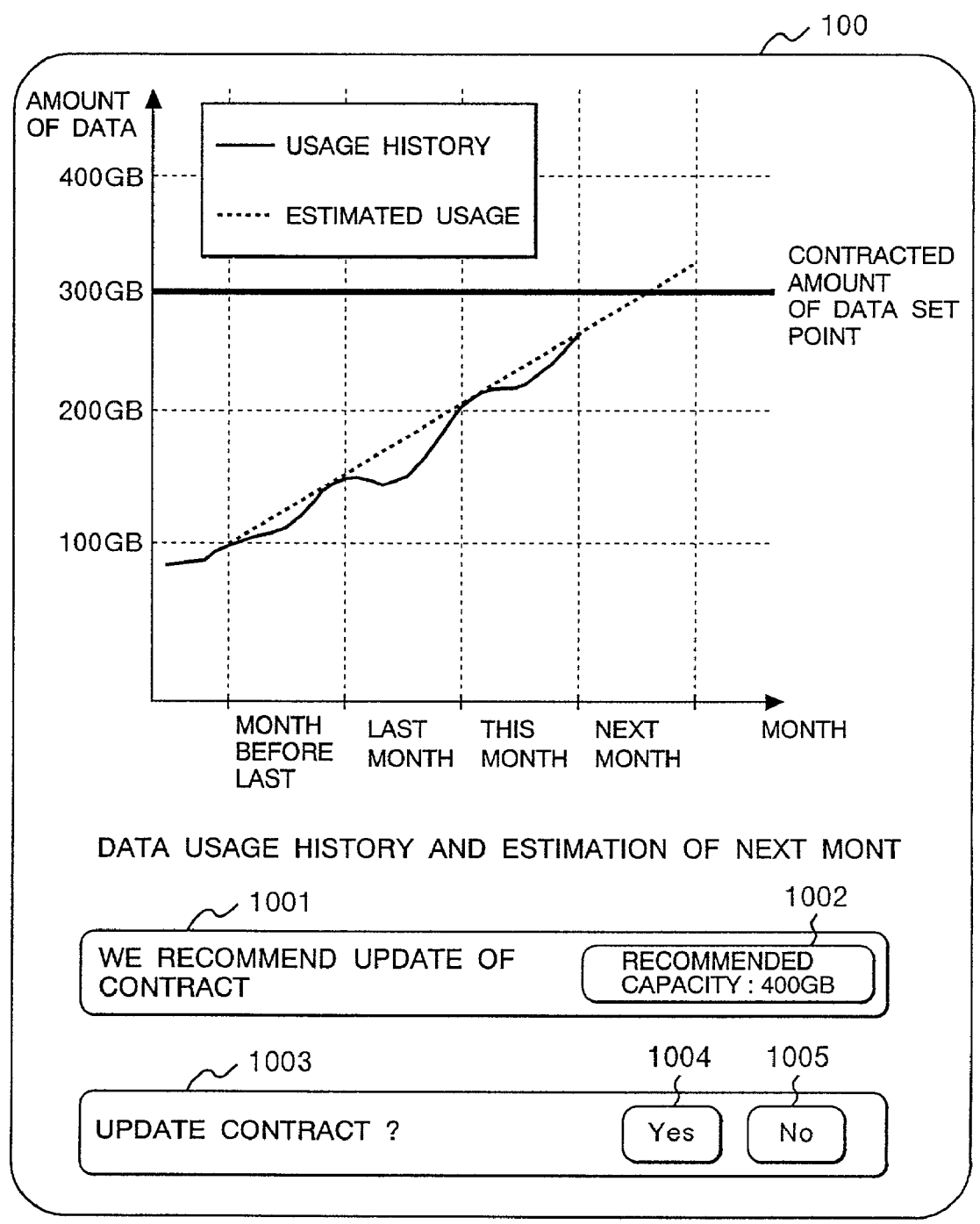
FIG. 17 is an exemplary display screen image of estimated data usage reported to the rental storage service user 1.

In case of fixed charge option, as shown in FIG. 17, an estimated transaction of data after a given period of time will be calculated (step 4) to calculate the point of time at which the data usage may reach to the predetermined threshold (step 5). The predetermined threshold is a quantity determined for the rental storage service user 1 to be reported when the amount of transacted data usage approaches to the value, as have been described above. Thereafter, the estimation file 88 shown in FIG. 7 will be updated with this value.

Figure 18:
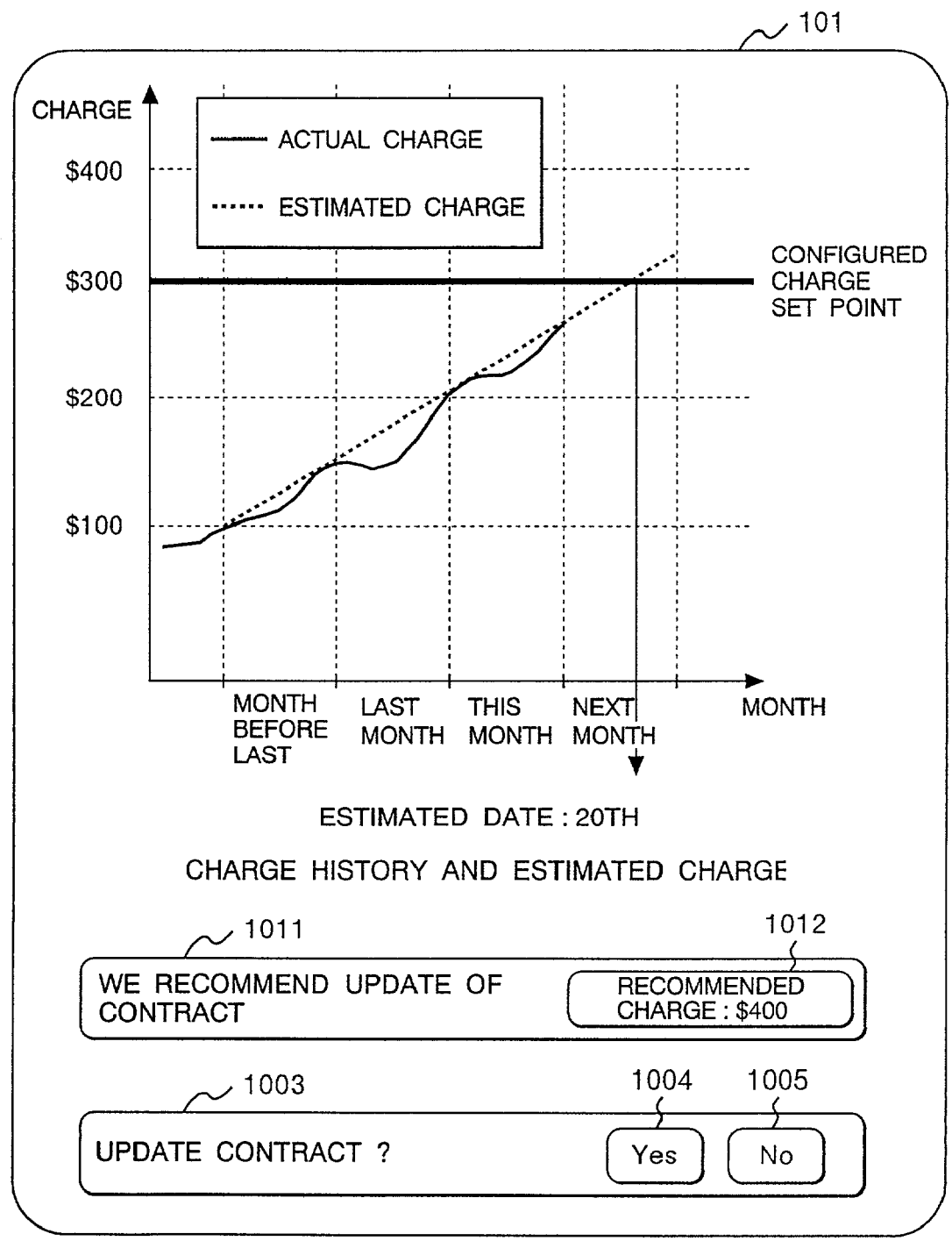
FIG. 18 is an exemplary display screen image of billing charge reported to the rental storage service user 1.

In case of floating (specific) charge, as shown in FIG. 18, an estimated charge after a predetermined period of time will be calculated (step 4) to determine the point of time to reach to the configured amount of charge (step 5). This configured amount of charge is a value defined so as for the rental storage service user 1 to be reported when the transaction data usage reaches the value. Thereafter, the estimation file 88 shown in FIG. 7 will be updated with this value.

(V) User Interface of the Rental Storage Service

Now the user interface provided by the rental storage service in accordance with the preferred embodiment of the present invention will be described in greater details with reference to FIG. 16 through FIG. 18.

Figure 16:
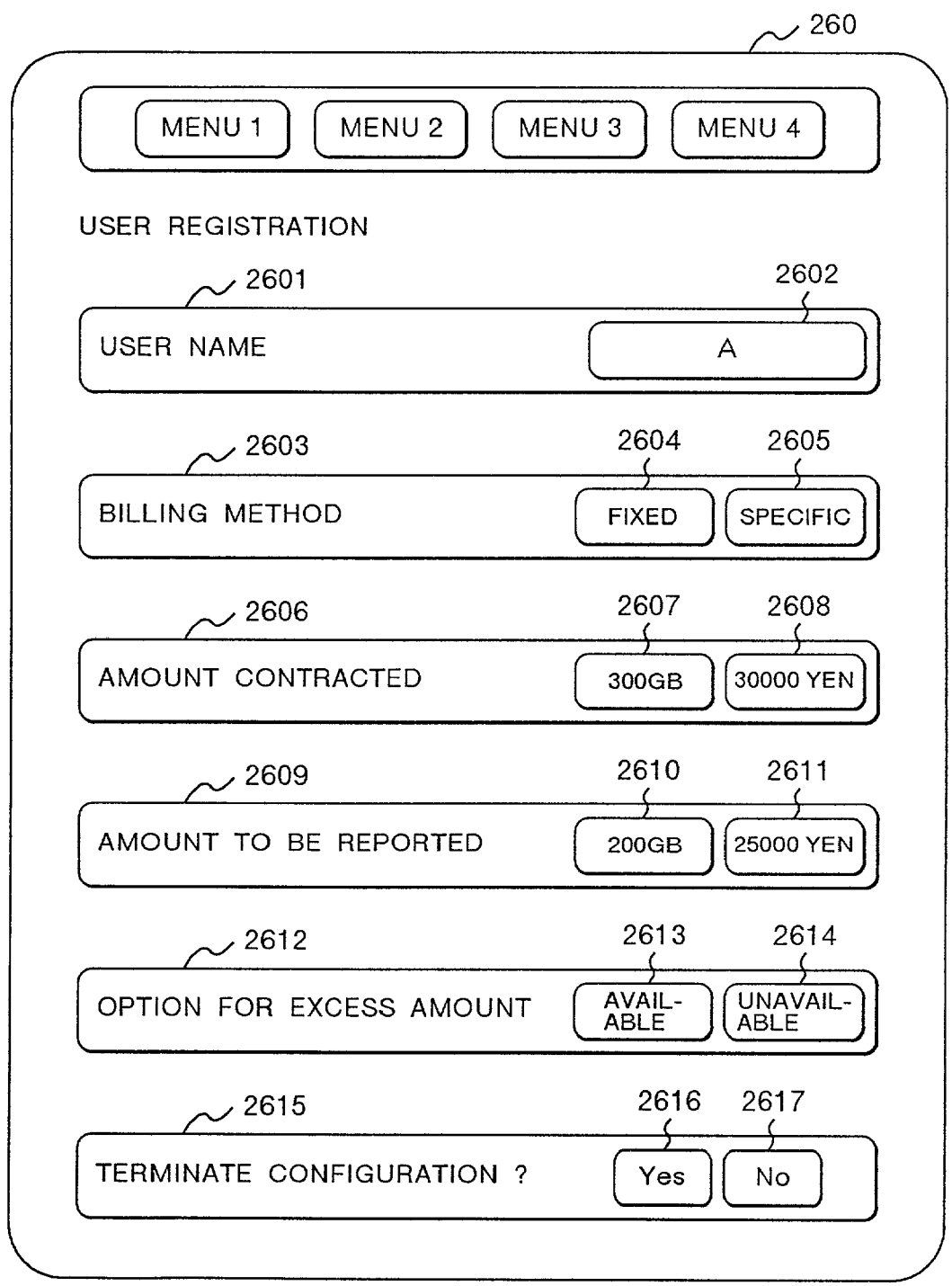
FIG. 16 is an exemplary display screen image of user configuration page.

FIG. 16 is an exemplary display screen image of user configuration page.

FIG. 17 is an exemplary display screen image of estimated data usage reported to the rental storage service user 1.

FIG. 18 is an exemplary display screen image of billing charge reported to the rental storage service user 1.

The user configuration display 260 shown in FIG. 16 allows the user to easily configure the contract options by using GUI (graphical user interface).

The rental storage service user 1 will enter his/her name into the field of user name 2602 displayed in the user name configuration 2601. Then the user will use the mouse to point and click either the fixed charge button 2604 or the specific charge button 2605 according to his/her desirable billing method 2603. Then the user will enter a value into either the field of contracted capacity 2607 in case of the fixed charge or the field of contracted capacity 2608 in case of the specific charge, displayed in the contracted amount display 2606.

The field of reporting value configuration display 2609 is a field to be filled with a value at which the rental storage service provider 2 will report to the rental storage service user 1 if the storage usage approaches to a given level. The rental storage service user 1 will enter an appropriate value into the field of the amount of data to be reported 2610 in case of fixed charge, or into the field of the amount of data to be reported 2611 in case of specific charge.

The contract option configuration field for excess amount 2612 is a toggle configuration to enable or disable the excess usage of storages if the transacted amount of data usage exceeds the contracted amount of data. If available 2613 is selected, then the charge may be surplus but the storage service will be available for the excess data out of the contract. If unavailable 2614 is selected, then the storage service for the excess data will be denied, while the charge will be limited to the contract conditions.

After all necessary fields are fulfilled, then the user will point and click Yes button 2616 below the terminate configuration display 2615.

With this display screen, the rental storage service user 1 may configure the contract conditions with simple operation.

The display screen 100 shown in FIG. 17 may expect a monthly fixed charge as the billing method. This display is characterized by the display of the history of transaction usage and the expected amount of data in the same chart in the same screen as the user interface for reporting to the rental storage service user 1. The chart shown has the amount of data in ordinates and months in abscissas. The course of data usage in the most recent three months will be displayed as the usage record data in a solid line, and the estimated transaction usage in the next month will be displayed by dotted line as the approximation. The data usage of the contract conditions for the rental storage service user 1 will be displayed as the bold solid line. It is estimated that from this chart, the contract user will have the amount of data more than the currently contracted capacity of 300 GB by the middle of the next month. This display screen may provide the user interface which is very easy to operate and easy to understand for the rental storage service users by displaying the recommended update 1001 of contract together with the recommended capacity 1002, and by displaying the demand display of contract update 1003 together with the select buttons 1004 and 1005. As the display means for reporting to users, graphics may be provided on the www (web page) style such that the user may be able to update easily the contract conditions with a comprehensive GUI, or such that the automated process may be available by using a script.

The display 101 shown in FIG. 18 expects the floating charge by months as the billing method. This display screen is characterized by displaying the billing charge superposed on the expected charge in the same chart, as the user interface for reporting the charge records and expected bill to the rental storage service user 1. The chart may display the amount of charge in ordinates and months in abscissas. The three-months history of charge will be displayed as the actual charge by a solid line, while the estimated charge for the next month will be displayed as the approximation by a dotted line. At the same time the charge limit of the rental storage service user 1 may be drawn on the chart by a bold solid line. It can be estimated that from this chart that the contract user will have the transaction usage more than the currently configured charge limit of 300 dollars by the middle of the next month, and the date at which the charge limit will be bridged is expected to be at 20th of next month.

In addition, similar to the display shown in FIG. 17, the display is characterized by displaying the recommended update of contract 1011 together with the recommended charge 1012, as well as displaying the update confirmation 1003 together with the confirmation button 1004 and 1005 to provide easy-to-use, easy-to-operate, and comprehensive user interface for the rental storage service user. It is also preferable as similar to the case shown in FIG. 17, that graphics as the display means for reporting to users may be provided on the www (web page) style such that the user may be able to update easily the contract conditions with a comprehensive GUI, or such that the automated process may be available by using a script.

[Second Embodiment]

Now second preferred embodiment of the present invention will be described in greater details with reference made to FIG. 19 through FIG. 21.

Figure 19:
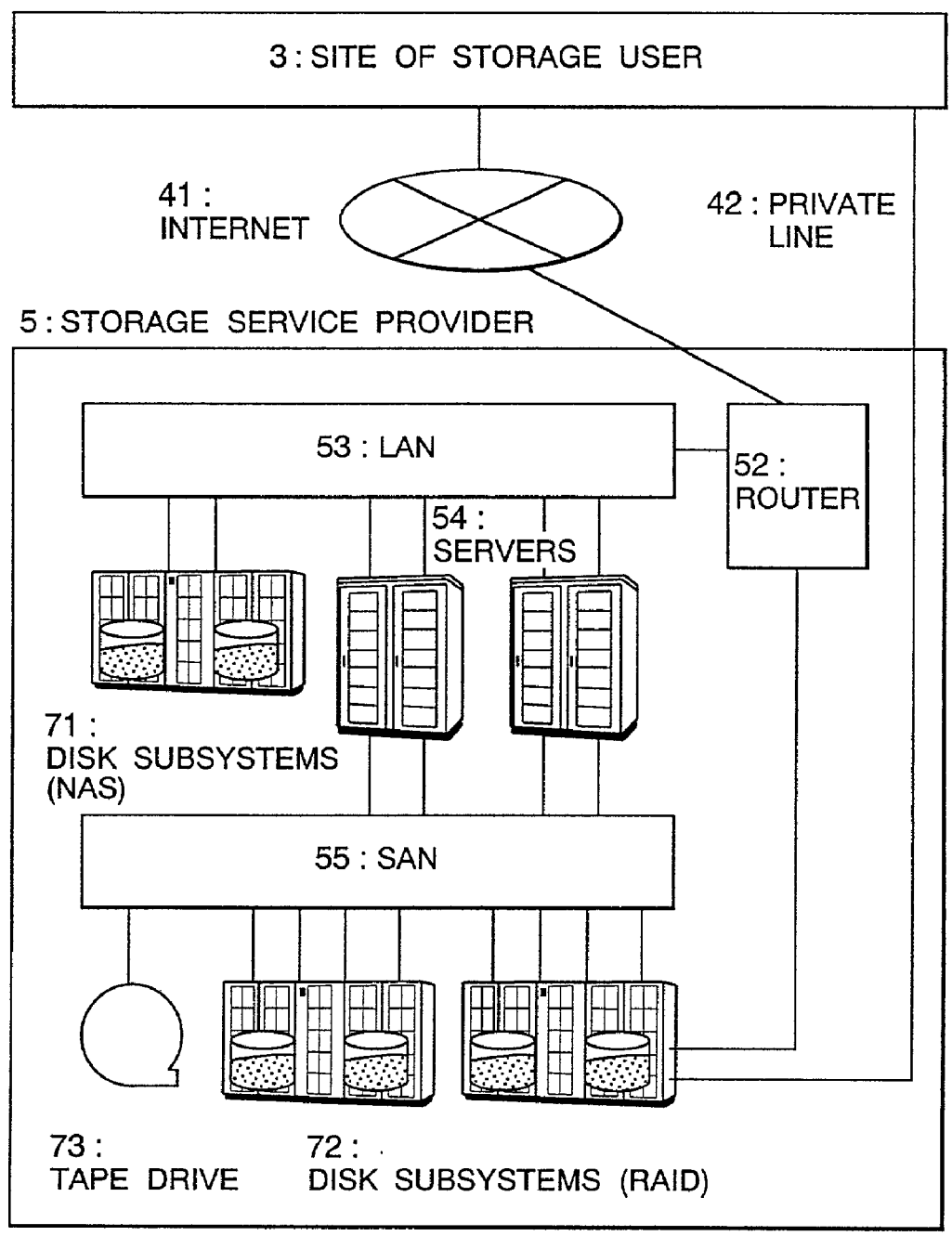
FIG. 19 is a schematic block diagram illustratively indicative of a system hardware architecture of the rental storage service system of second preferred embodiment in accordance with the present invention.

FIG. 19 is a schematic block diagram illustratively indicative of a system hardware architecture of the rental storage service system of second preferred embodiment in accordance with the present invention.

Figure 20:
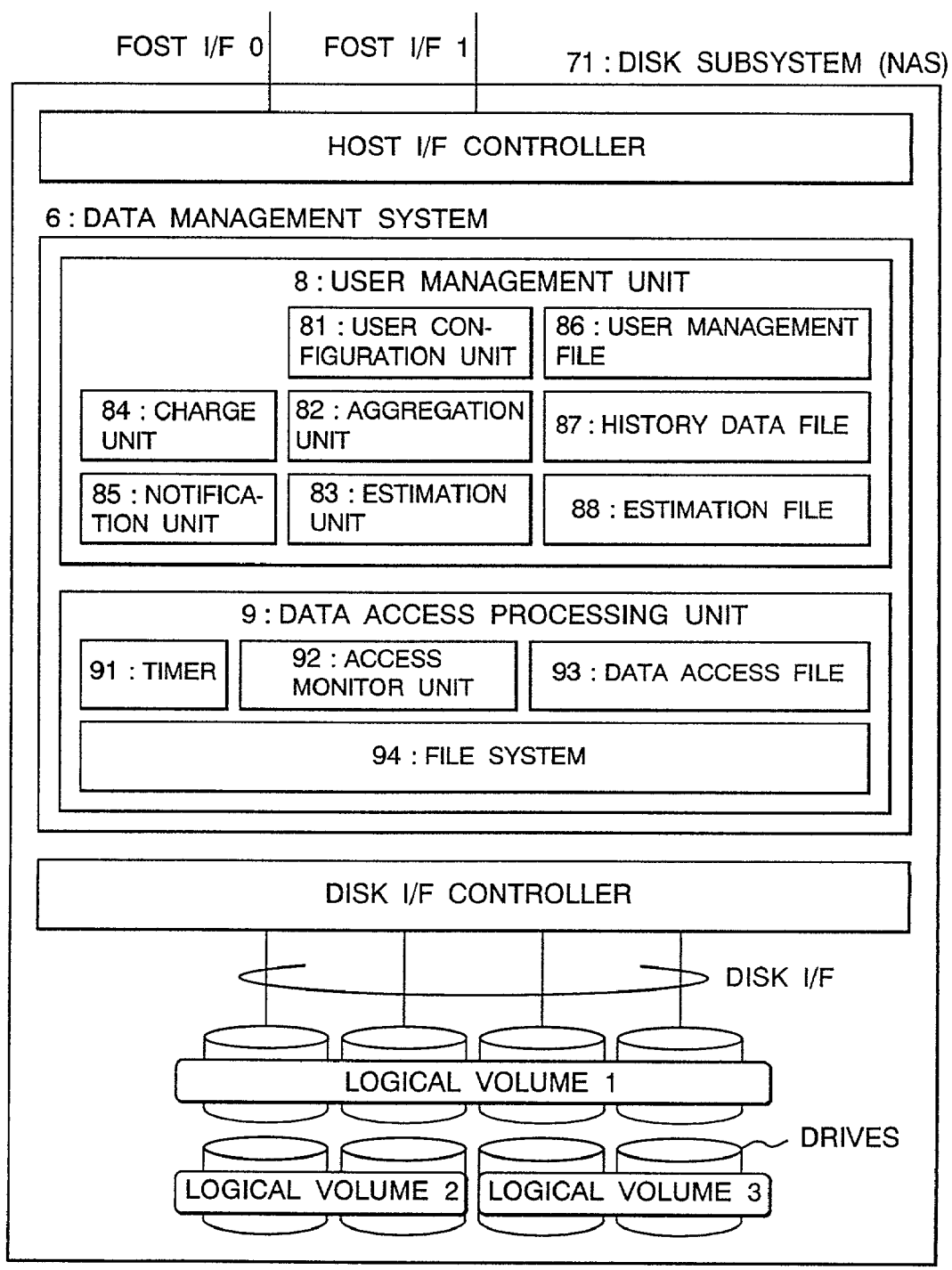
FIG. 20 is a schematic block diagram illustratively indicative of a system architecture of the rental storage service system of second preferred embodiment in accordance with the present invention (first part)

FIG. 20 is a schematic block diagram illustratively indicative of a system architecture of the rental storage service system of second preferred embodiment in accordance with the present invention (first part).

Figure 21:
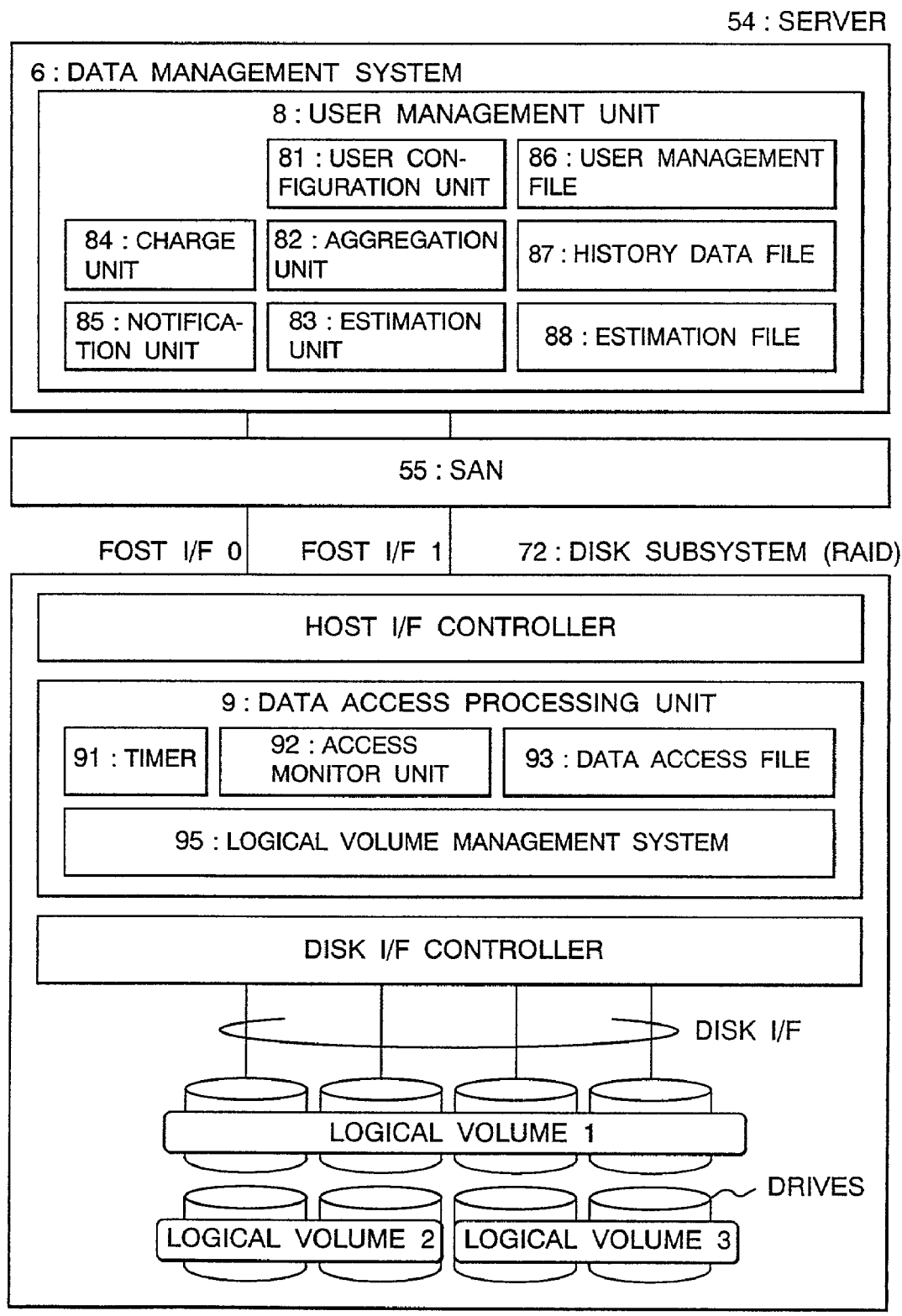
FIG. 21 is a schematic block diagram illustratively indicative of a system architecture of the rental storage service system of second preferred embodiment in accordance with the present invention (second part)

FIG. 21 is a schematic block diagram illustratively indicative of a system architecture of the rental storage service system of second preferred embodiment in accordance with the present invention (second part).

The second preferred embodiment is presented for the purpose of practically clarify the system architecture embodying the rental storage service described in the preceding first embodiment.

The system architecture of the second preferred embodiment uses both the Internet 41 and the private line 42 for the network that interconnects the site of storage user 3 and the site of storage service provider 5. The site of storage service provider 5 includes a router 52 for connecting to the internet, in the storage system a NAS 71 as disk drives for connecting to the LAN 53, two RAID systems 72 and a tape drive 73 as disk drives for connecting to the SAN 55 in addition to a server 54 for executing the management software for the storage and SAN. The term SAN (storage area network) indicates a form of high-speed proprietary network between the processor and the storage devices.

The data management system 6 that the functionality has been described in the preceding first preferred embodiment, for implementing the rental storage service in accordance with the present invention, may have the functionality of a storage device, or may be implemented on the server.

For example, as shown in FIG. 20, the data management system 6 may be installed in the disk controller NAS 71. The disk controller NAS 71 may incorporate a host I/F controller, disk I/F controller, disk I/F, data access processing unit 9, and a plurality of drives, as well as the data management system 6. The NAS is characterized by transmitting and receiving data in file basis, and by including a file system 94 as part of the data access processing unit.

When building a system in the aspect of FIG. 20, the estimation of data and charge calculation will be executed in the disk controller NAS 71, while the server will output final results and statistics.

As shown in FIG. 21, the data management system 6 may be incorporated in the server 54. In FIG. 21, the server 54 includes the data management system 6 connecting to the RAID disk drives 72 as storage devices through the host I/F and the SAN 55.

The RAID disk drives 72 may have respectively a host I/F controller, a disk I/F controller, a disk I/F, a plurality of disk drives, and a data access processing unit 9. The data access processing unit 9 of the RAID disk drives 72 is characterized by having a logical volume management system 95 for implementing a RAID system.

When building a system in a form of FIG. 21, the RAID disk drives 72 will report the data access rate and access time to the server 54, which in turn will perform the estimation and billing calculation of the data usage by the user.

[Third Embodiment]

Now third preferred embodiment in accordance with the present invention will be described in greater details herein below with reference made to FIG. 22 through FIG. 27.

In third preferred embodiment of the present invention, only the difference from the preceding first and second embodiments and the addition thereto will be primarily described.

(I) Overview of the Rental Storage Service in this Embodiment

Figure 22:
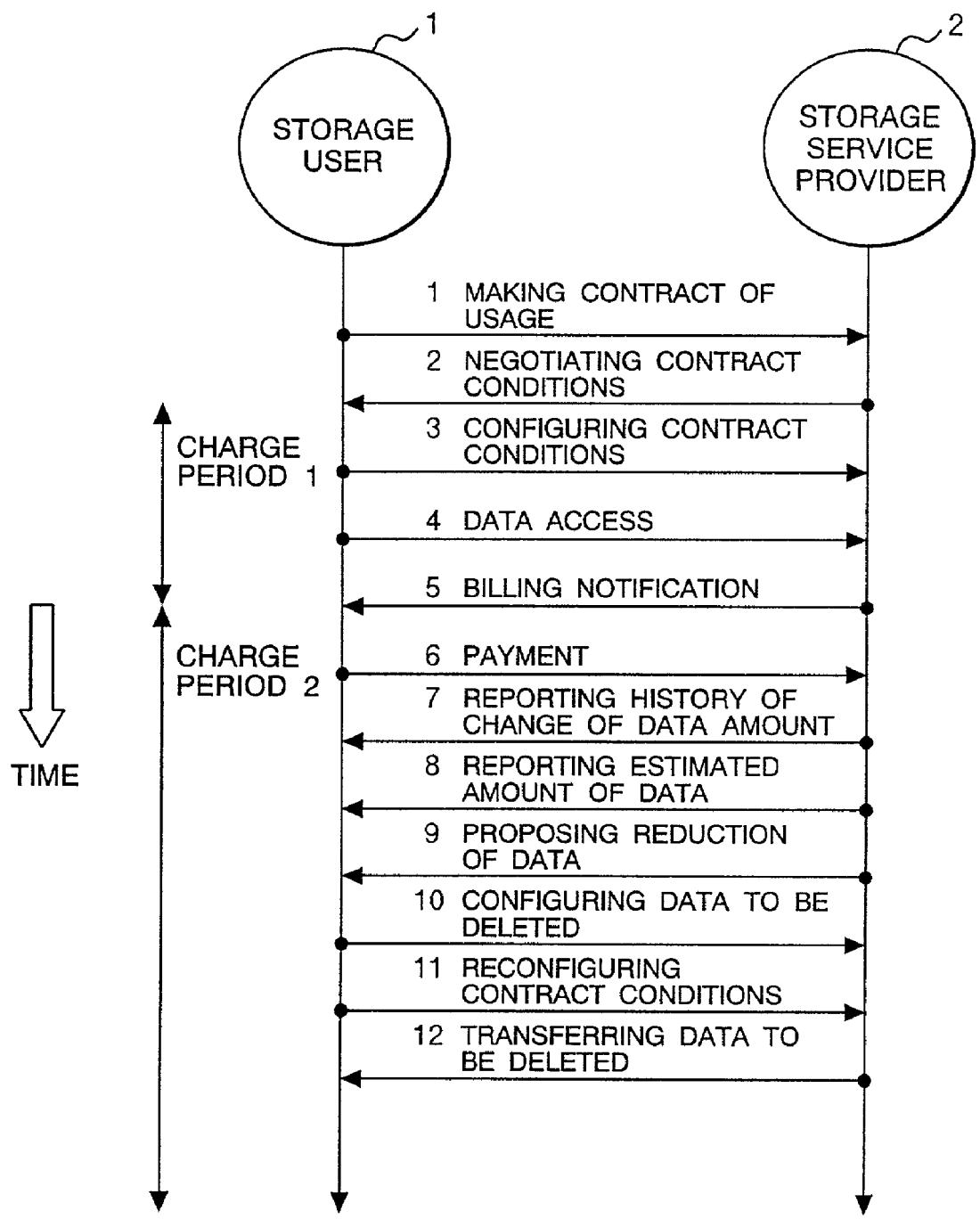
FIG. 22 is a schematic diagram illustratively indicative of chronological procedure sequence between an rental storage service user and the rental storage service provider in accordance with third preferred embodiment of the present invention.

Now referring to FIG. 22, the rental storage service in this embodiment and its concept will be overviewed.

FIG. 22 is a schematic diagram illustratively indicative of chronological procedure sequence between an rental storage service user and the rental storage service provider in accordance with third preferred embodiment of the present invention.

The method of rental storage service and best mode carrying out the method in accordance with the present invention have been overviewed in the foregoing description. The present embodiment has been devised to achieve really effective usage of storage by offering the rental storage service users the opportunity of deleting data, in addition to the rental storage service as have been described above. More specifically, in this embodiment, if the transaction usage of user data expected by the rental storage service provider exceeds the contracted usage, then the rental storage service provider will suggest deletion of less frequently accessed data to the rental storage service user.

The flow of service procedure is shown in FIG. 22 and steps 1 to 8 are identical to those steps 1 to 8 shown in FIG. 3. In step 8 if the estimated usage exceeds the contracted usage, then the rental storage service provider 2 will send a suggested plan of data reduction to the rental storage service user 1 (step 9). This suggestion may be generated for specifying data to be deleted depending on the access frequency of the rental storage service user 1 and the data type.

Next, the rental storage service user 1 on the basis of the suggested plan, will select data to be deleted to the rental storage service provider 2 (step 10). If required, the rental storage service user 1 will reconfigure the contract conditions with the rental storage service provider 2 (step 11). The rental storage service provider 2 in turn will duplicate to a medium such as a tape or a CDR the data specified to be deleted in step 9 by the rental storage service user 1 and send the tape to the rental storage service user 1 (step 12). This step is a care when the rental storage service user 1 may need sometime deleted data.

(II) Details of the User Management Unit 8

Now referring to FIG. 23, the detailed architecture of the user management unit 8 in accordance with third preferred embodiment of the present invention will be described in greater details below.

Figure 23:
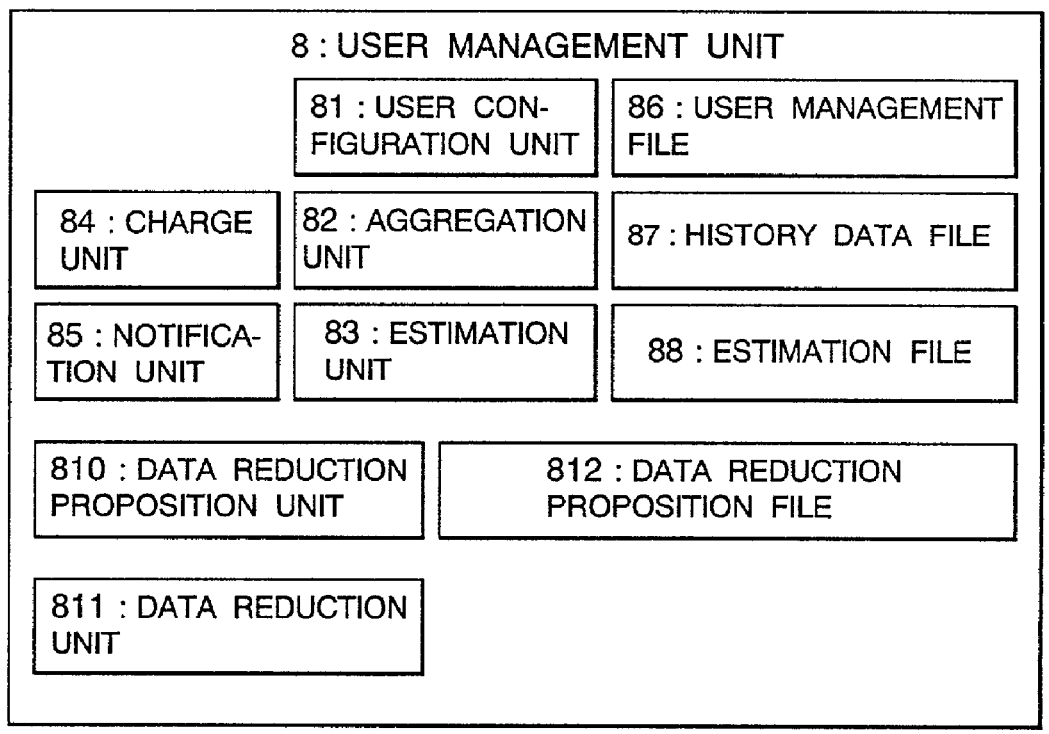
FIG. 23 is a typical system architecture of a user management unit 8 in accordance with third preferred embodiment of the present invention.

FIG. 23 is a typical system architecture of a user management unit 8 in accordance with third preferred embodiment of the present invention.

The user management unit 8 is the core of the rental storage service in accordance with the present invention, as have been described above. In this preferred embodiment, the user management unit 8 includes a data reduction proposition unit 810, a data reduction unit 811, and a data reduction proposition file 812 in addition to other components of the user management unit 8 described earlier by referring to FIG. 3.

The data reduction proposition unit 810 is for suggesting deletion of part of data to the rental storage service user 1 by determining the amount of data to be reduced by the rental storage service provider 2.

The data reduction unit 811 is a management unit for actually deleting data, performing a backup copy of the data marked to be deleted when required, and sending the backup copy of the data deleted to the rental storage service user 1. The data reduction proposition file 812 is a management file used for the purpose of the suggestion of deletion of data.

(III) Proposition File of Data Deletion

Now referring to FIG. 24 the data reduction proposition file will be described below.

FIG. 24 is a table illustratively indicative of typical contents of a data reduction proposition file 812.

In the illustrative example shown in FIG. 24, the user identifier is indicated in the data reduction proposition file 812 for the data owned by the user A. The data reduction proposition file 812 as shown in FIG. 24, has, for each data item, fields of check number, user identifier, storage area, name of data, amount of data, access frequency, non-deletion flag, deletion proposition flag, and sum of reduced amount.

The check number field will contain an identifier when handing this data.

Fields of user identifier, storage area, name of data, amount of data, access frequency are identical to those fields described in relation to the data access file 93 shown in FIG. 4. The access frequency may be used as the guidepost of the counter offer of the rental storage service user 1 with respect to the suggested deletion plan. It may be needless to say that the data less frequently accessed by the rental storage service user 1 of the user identifier A will be good candidate of deletion.

The non-deletion flag field indicates whether or not the rental storage service user 1, the owner of data, will include the data item to the group of candidates of deletion. The rental storage service user 1 will have to set this flag to non-deletion if the data is important or indispensable.

The deletion proposition flag field indicates that the rental storage service provider 2 has recommended the deletion of this data item.

The sum of deletion field indicates the total amount of data to be supposedly deleted. The sum of deletion is the total amount in the list.

In this preferred embodiment, data items of check numbers 2 and 3 in the list that has been sorted in the ascending order of access frequency are shown marked to suppose the deletion. Therefore, the total amount of deletion of the check number 3 are the total amount of data of the check numbers 2 and 3.

(IV) Data Deletion Process

Now referring to FIG. 25 and FIG. 26, the data deletion in accordance with the preferred embodiment of the present invention will be described in greater details herein below.

Figure 25:
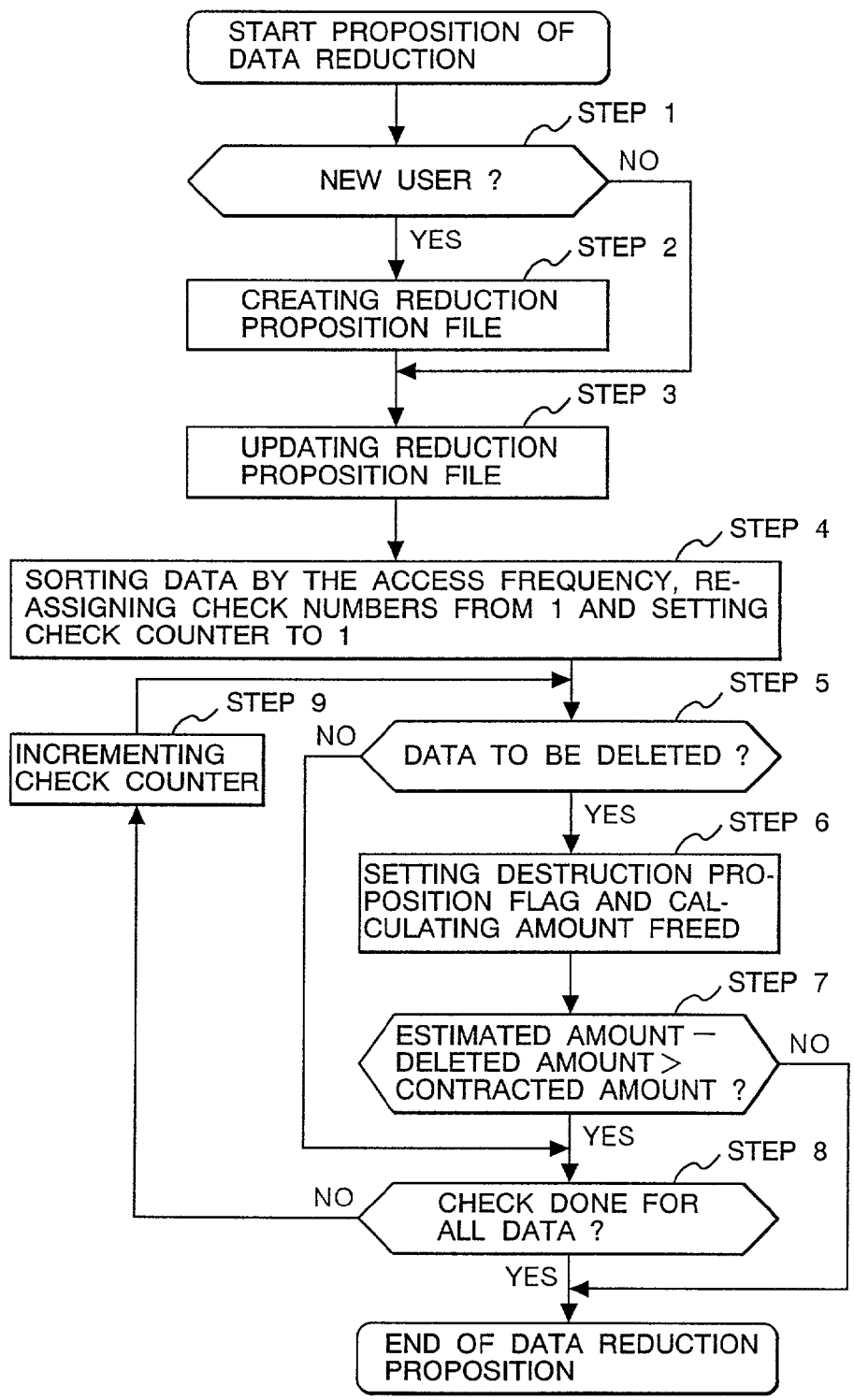
FIG. 25 is a flow chart illustratively indicative of process sequence of proposing the reduction of the amount of storage data.

FIG. 25 is a flow chart illustratively indicative of process sequence of proposing the reduction of the amount of storage data.

Figure 26:
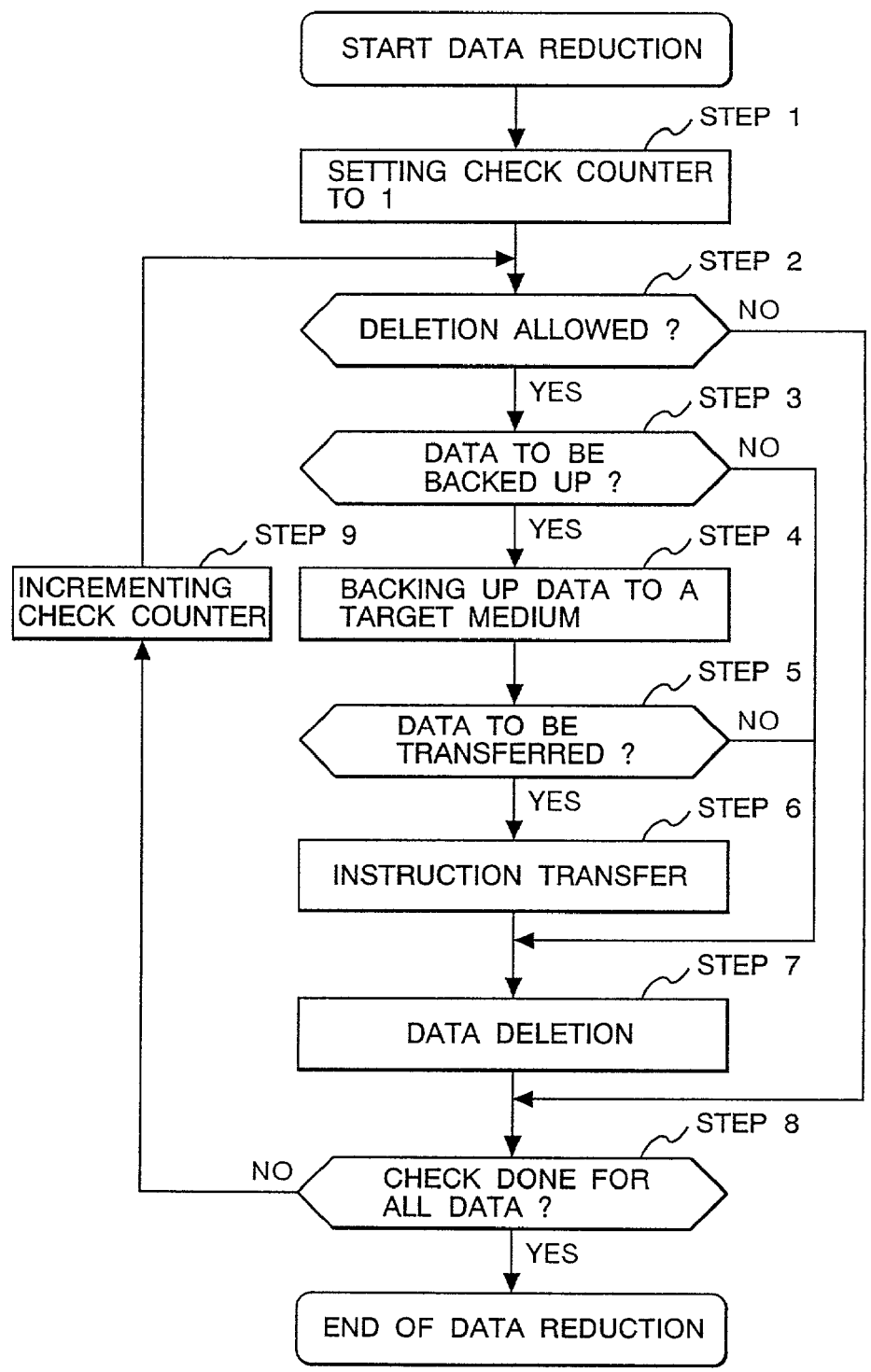
FIG. 26 is a flow chart illustratively indicative of process sequence of reduction of the amount of storage data.

FIG. 26 is a flow chart illustratively indicative of process sequence of reduction of the amount of storage data.

Now the program will check to see whether or not the rental storage service user in question is a new user having not yet the data reduction proposition file 812 created (step 1). This decision will be made by checking to see whether there is a list of users in question in the data reduction proposition file 812 described in FIG. 24 above. If the list is not found in this file, then an appropriate entry will be added to the data reduction proposition file 812 (step 2).

Then, the program will ask data access processing unit 9 to update the data reduction proposition file 812 (step 3). Next, the entries will be sorted in the ascending order of access frequency to reallocate a check number 1 to the topmost data item entry, to set the check counter for use of control (step 4). The check counter will be used for controlling the check to see whether the item in question is marked to be deleted or not.

Now referring to non-deletion flags in the data reduction proposition file 812 the data marked to be checked will be determined to be deleted or not (step 5). If the data item is not marked to be deleted, then the process proceeds to step 8, where if all data entries are not checked (step 8), the check counter will be incremented (step 9) to proceed to the check of next data item.

If the data is marked to be deleted, then the deletion proposition flag of the data reduction proposition file 812 will be set to calculate the sum of amount of data to be deleted to display the sum (step 6).

Then, the value yield by subtracting the sum of deletion from the estimation will be checked to see whether to be larger (step 7). If the subtracted value is larger than the contracted amount, then it indicates that the estimated amount is still larger, so that the process will proceed to step 8 so as to increase the amount of data being suggested to delete. If all data items are not yet checked (step 8), then the check counter will be incremented (step 9) to check the next data item.

If, on the other hand, the subtracted value is less than the contracted amount, then it indicates that the number of data items marked to delete has been enough increased so that the program will terminate.

Now referring to FIG. 26, the data deletion will be described.

This process will be executed when the rental storage service user 1 specifies which data items be deleted according to the proposed plan of data reduction by the rental storage service provider 2.

First, the controlling check counter will be set to 1 (step 1).

Next, it will be checked to see whether the rental storage service user 1 has done selection of the current data item in question to be deleted (step 2). If the current data item in question is not marked to delete, and if there is still data not yet checked (step 8), the check counter will be incremented to see the next data item to check.

When the data is marked to delete, then the program will check to see whether the data item is marked by the rental storage service user 1 as requiring a backup copy (step 3), then the backup copy of data will be made on a backup medium (step 4). Next, the program will check to see whether the current data item in question is marked as requiring a send-back (step 5). If the data needs to send back to the user, then the program will instruct to send back the backup data to the rental storage service user 1 (step 6).

If the data item in question is neither to be deleted nor to be backed up in step 3 and step 5 respectively, then the program will proceed to step 7 to actually delete the data in question (step 7).

After deleting the data, if not yet all data is checked (step 8), then the check counter will be incremented to check to see the next data item.

If all data has been already checked then the process will terminate.

(IV) User Interface for Suggesting the Data Deletion

Now referring to FIG. 27, the user interface for suggesting data deletion in accordance with the preferred embodiment of the present invention will be described in greater details below.

Figure 27:
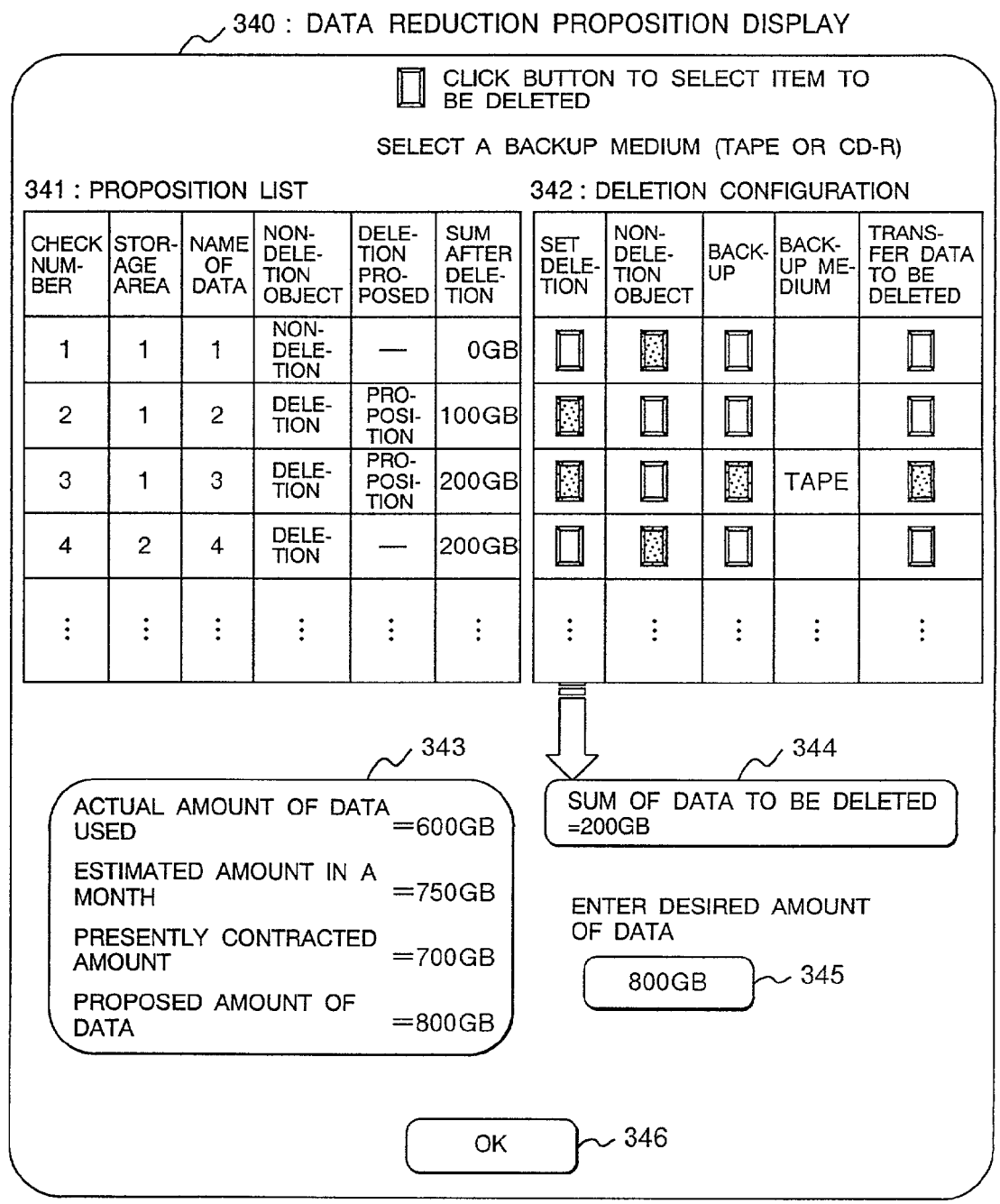
FIG. 27 is an exemplary display screen image of a page for proposing deletion options of the storage data.

FIG. 27 is an exemplary display screen image of a page for proposing deletion options of the storage data.

The display screen proposing data deletion in accordance with the preferred embodiment contains two sections of the proposition list 341 for supposing the deletion to the rental storage service user 1 and of the deletion configuration 342 for the rental storage service user 1 to configure deletion.

The rental storage service user 1 will confirm the information proposed by the rental storage service provider 2 by checking the proposition list 341 in order to decide whether data in his/her area should be deleted or not. The list is a user interface which is user friendly in that the sum of deletion may be displayed.

The rental storage service user 1 may enter his decision into the deletion configuration 342 area to inform whether the appropriate data are to be actually deleted, marked to be deleted, marked to be backed up in a specified medium and to send back to the user when deleting.

When specifying a backup copy before deleting and sending back the copy, the rental storage service user 1 may delete data at ease because any data thus deleted may be recoverable later if the user desires to use.

The size display field 343 will display the sum of current data, the estimated sum of data in a given period of time, the contracted data capacity, and the recommended data capacity.

The sum display of deletion field 344 will display the sum of data marked to be deleted by specifying in the deletion configuration 342 by the user.

The contract capacity update field 345 will be useful for entering a desired amount of storage by the rental storage service user 1.

After any configuration completed in this screen, the user may click the OK button 346.

[Management Strategy of Storage System by the Rental Storage Service Provider]

Now referring to FIG. 28 and FIG. 29, the management strategy by the rental storage service provider with respect to the rental storage service system in accordance with the present invention will be described in greater details herein below.

The user interface displayed on the management server console at the rental storage service provider site will be described first, with reference made to FIG. 28.

Figure 28:
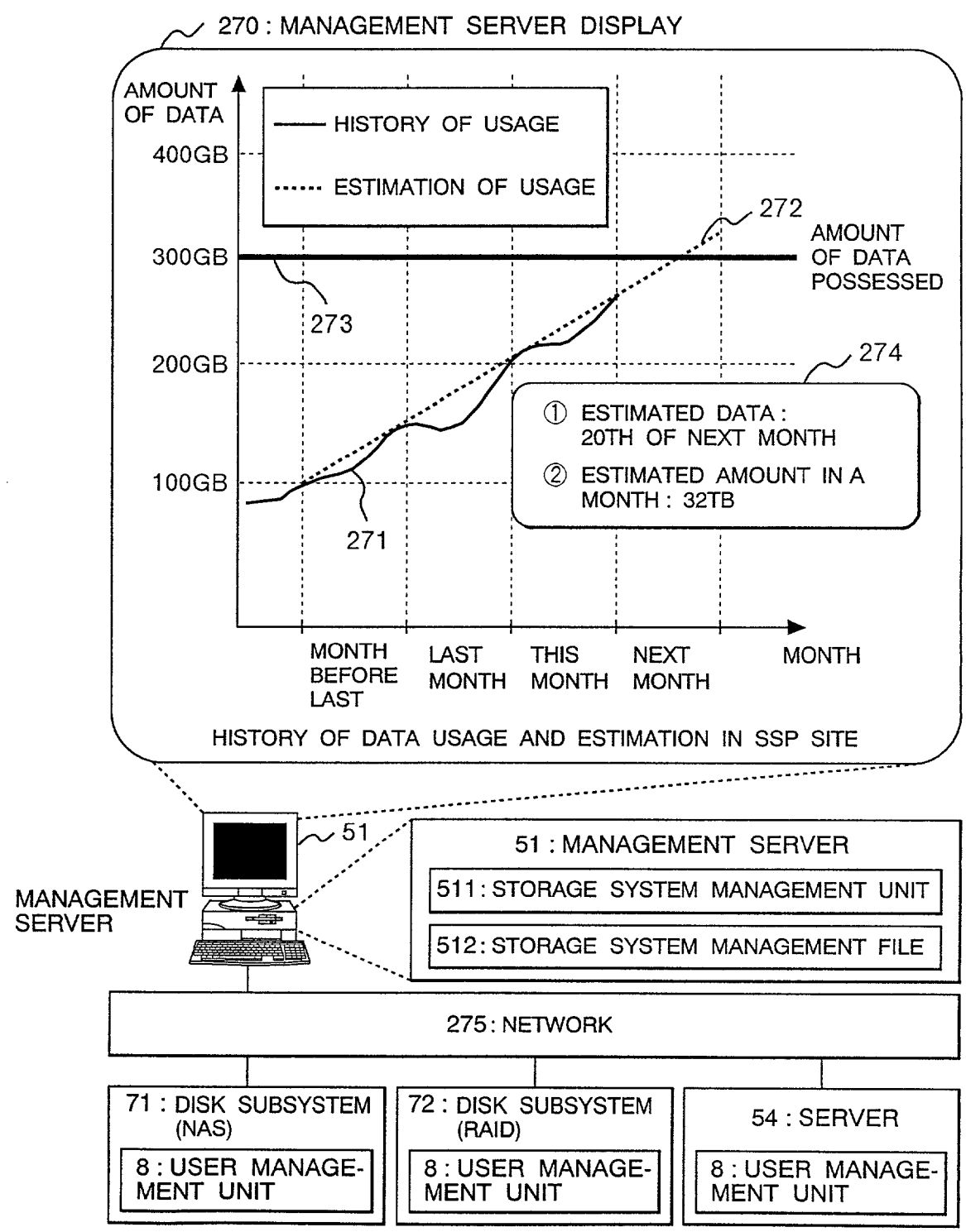
FIG. 28 is a management server display screen presented on a console of the management server and the overview of the rental storage service system.

FIG. 28 is a management server display screen presented on a console of the management server and the overview of the rental storage service system.

In the rental storage service provider site, as have been described above, there are a plurality of storage systems each consisted of the disk controller NAS 71, the RAID disk drives 72, and the server 54, as well as respective user management unit 8.

The management server 51 is a server for administrating the plurality of storage systems, connected to each storage system through the network 275. In the figure the network 275 is depicted as a single connection, plural networks or a dedicated network for each storage system may be equally used. For the network 275 any LAN and SAN may be used.

The management server 51 has a storage system management unit 511 and a storage system management file 512.

The management server console display 270 displayed on the console of the management server 51 indicates a chart including the history of data usage record in the SSP and the estimated usage of next month. In this chart, the history of data usage actually used so far may be displayed as the actual usage record of data 271 as a solid line, while the estimation of data usage in the future may be displayed as the estimated usage 272 as a dotted line. Total storage capacity of the storage systems installed in the SSP is also displayed as the total capacity 273. Furthermore, the date imposed at which the estimated amount of data reaches the total capacity 273, or the estimated amount of data in a month may be displayed as the estimated value 274.

The administrator(s) may recognize at ease the status of storage usage in the system by looking at the management server console display 270, assisted by the comprehensive GUI (graphical user interface).

Now referring to FIG. 29, the management of the rental storage service system in accordance with the present invention will be described in greater details below.

Figure 29:
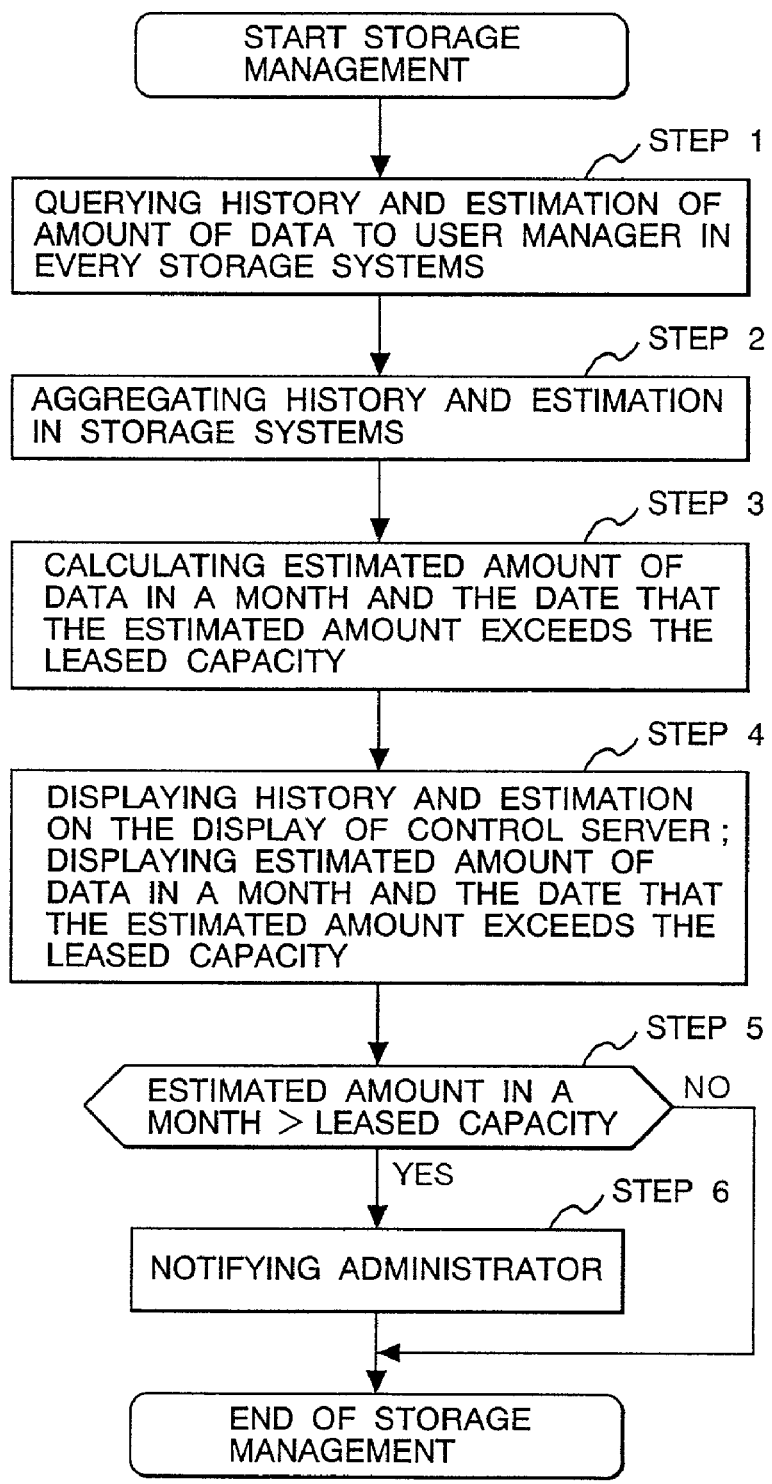
FIG. 29 is a flow chart illustratively indicative of process sequence performed by a storage system management unit 511.

FIG. 29 is a flow chart illustratively indicative of process sequence performed by a storage system management unit 511.

This process may be regularly invoked for example at the end of every month, at a given interval by the internal timer of the management server 51.

At the beginning of the process, the program will inquire the history of data usage and the estimated usage to the user manager unit of each storage system installed in the SSP (step 1). Then the management server 51 will aggregate all of history of data usage and estimated data thus queried (step 2). The aggregation will be stored in the storage system management file 512 shown in FIG. 28.

Then, the estimated data usage in a month and the date at which the estimated amount of data exceeds the storage capacity of the SSP will be calculated (step 3). In the present embodiment, a predetermined period of time is assumed a month, however any period of time may be defined, which seems to be reasonable in the management task from the view point of the administrator.

Then, as shown in FIG. 28, on the management server console display 270, the history of data usage and the estimated amount of data will be displayed in a chart. In addition, the estimated amount of data in a month as well as the date forecasted at which the amount of data exceeds the total capacity of the SSP will be displayed (step 4). Thereafter, the estimated amount of data in a month will be checked to see whether to exceed the storage capacity owned by the SSP (step 5). If the data size may exceed the capacity, then the administrator will be reported and warned (step 6).

If otherwise the data size may fit within the storage capacity of the SSP, then the process will terminate.

In the present embodiment, the history of data usage and the estimated amount of data will be derived from every storage systems to aggregate in the storage system management unit 511. However, as another typical example of the system, the storage system management unit 511 may include the user management unit 8 shown in FIG. 3, in particular the data usage estimation unit and estimation file 88 so as to retrieve the history of data usage from the storage system and to calculate the estimated amount of data in the storage system management unit 511 itself.

[Some Modes of Rental Storage Service]

Now referring to FIG. 30 to FIG. 33, the process sequence performed between the rental storage service user and the rental storage service provider in some modes carrying out the rental storage service in accordance with the present invention will be described in greater details.

FIG. 30 to FIG. 33 are schematic pattern diagrams illustratively indicative of process sequence performed between a rental storage service user and the rental storage service provider in the rental storage service.

Figure 30:
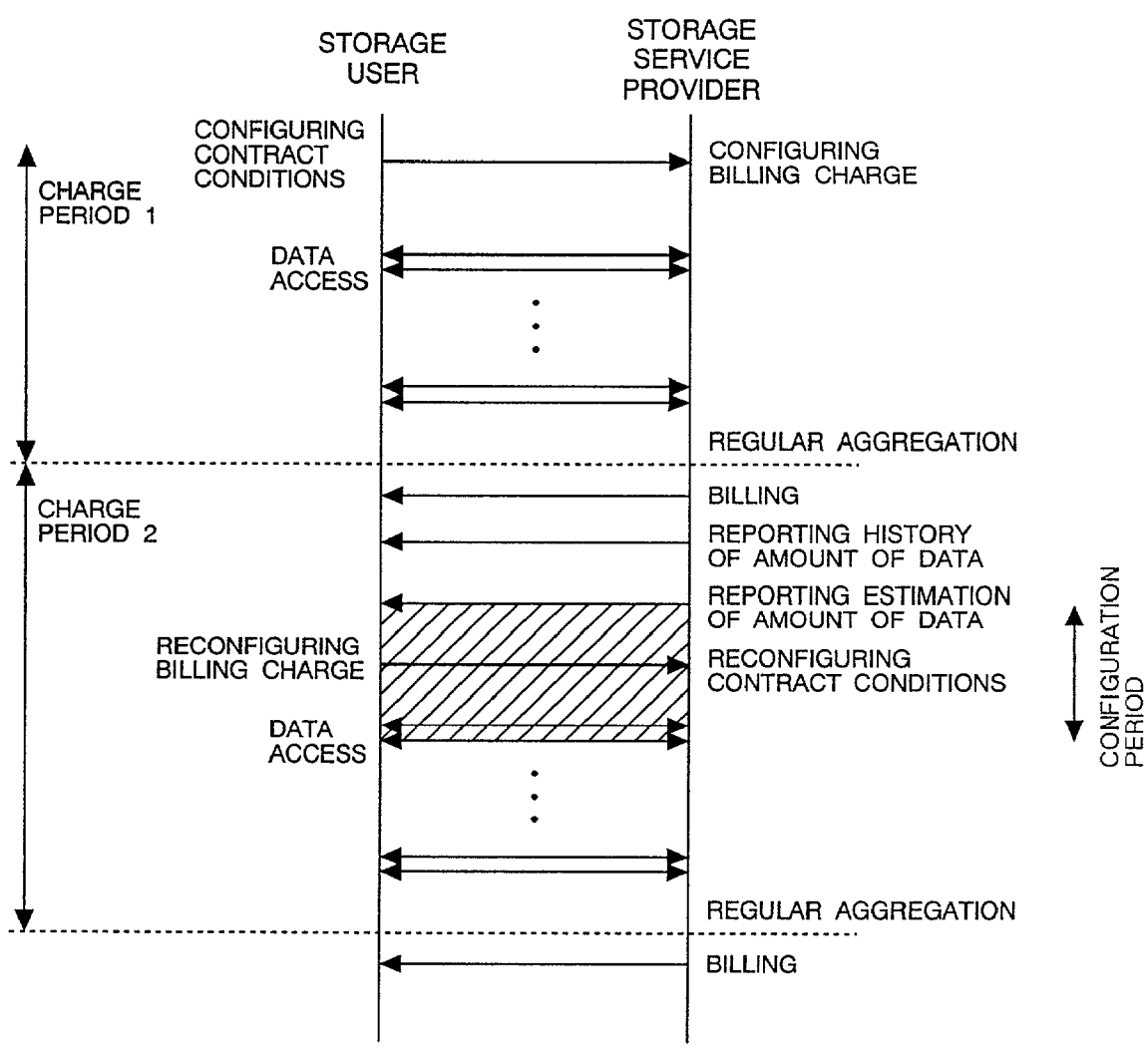
FIG. 30 is a schematic pattern diagram of process sequence performed between a rental storage service user and the rental storage service provider in the rental storage service (first part)

In the process depicted in FIG. 30, the rental storage service provider will report the estimated amount of data to the rental storage service user, while the user will suitably alter and update the contract conditions accordingly to reconfigure the usage contract.

Figure 31:
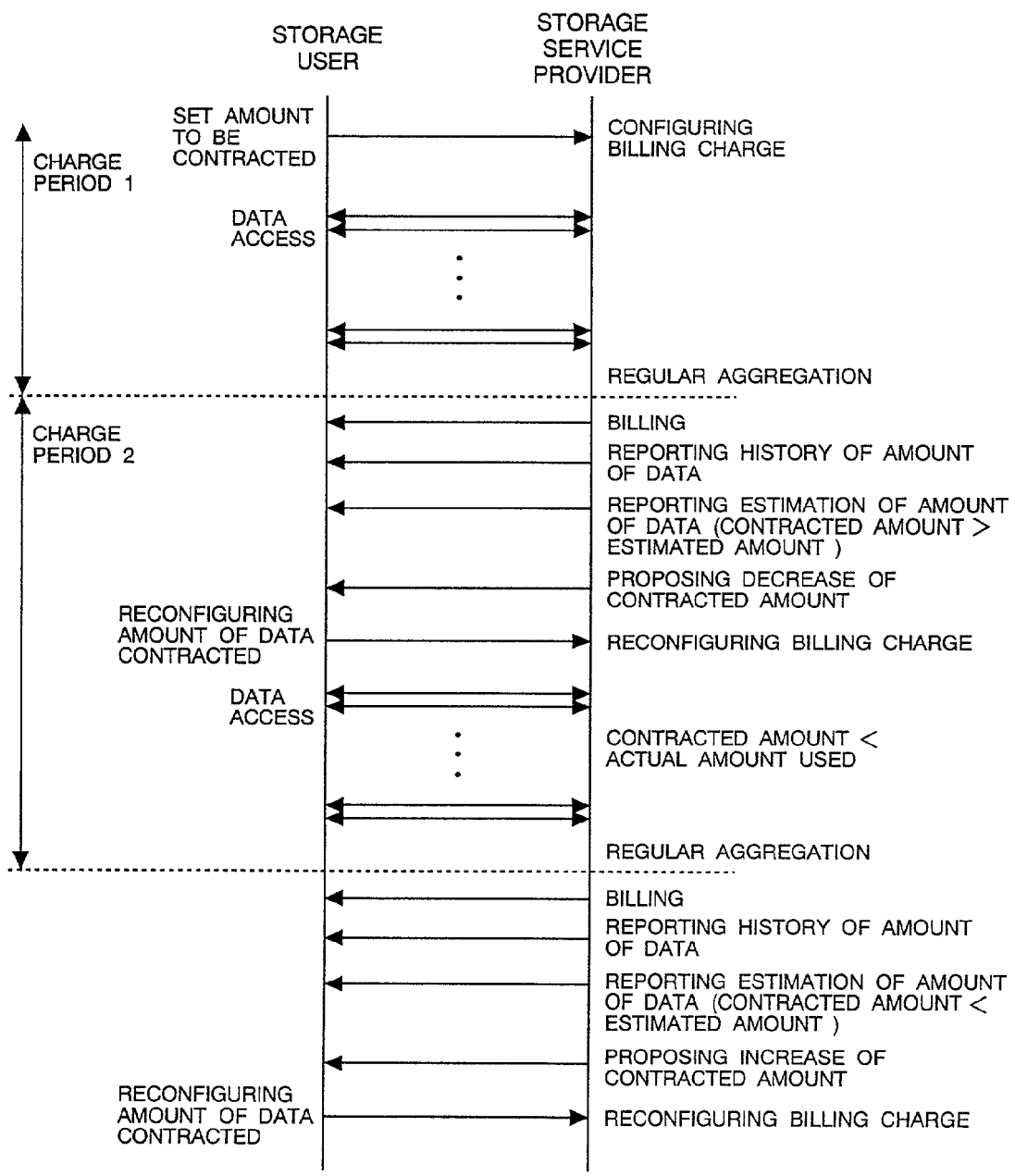
FIG. 31 is a schematic pattern diagram of process sequence performed between a rental storage service user and the rental storage service provider in the rental storage service (second part)

In the process depicted in FIG. 31, the rental storage service provider will report in particular a suggestion of recommended reconfiguration of contract in addition to the estimated amount of data to the rental storage service user. More specifically, if the contracted usage is larger than the estimation, then the provider will propose decrease of contracted usage; while the contracted usage is smaller than the estimated usage, then the provider will propose increase of contracted amount of data. The rental storage service user will accordingly update the contract to reconfigure the conditions.

Figure 32:
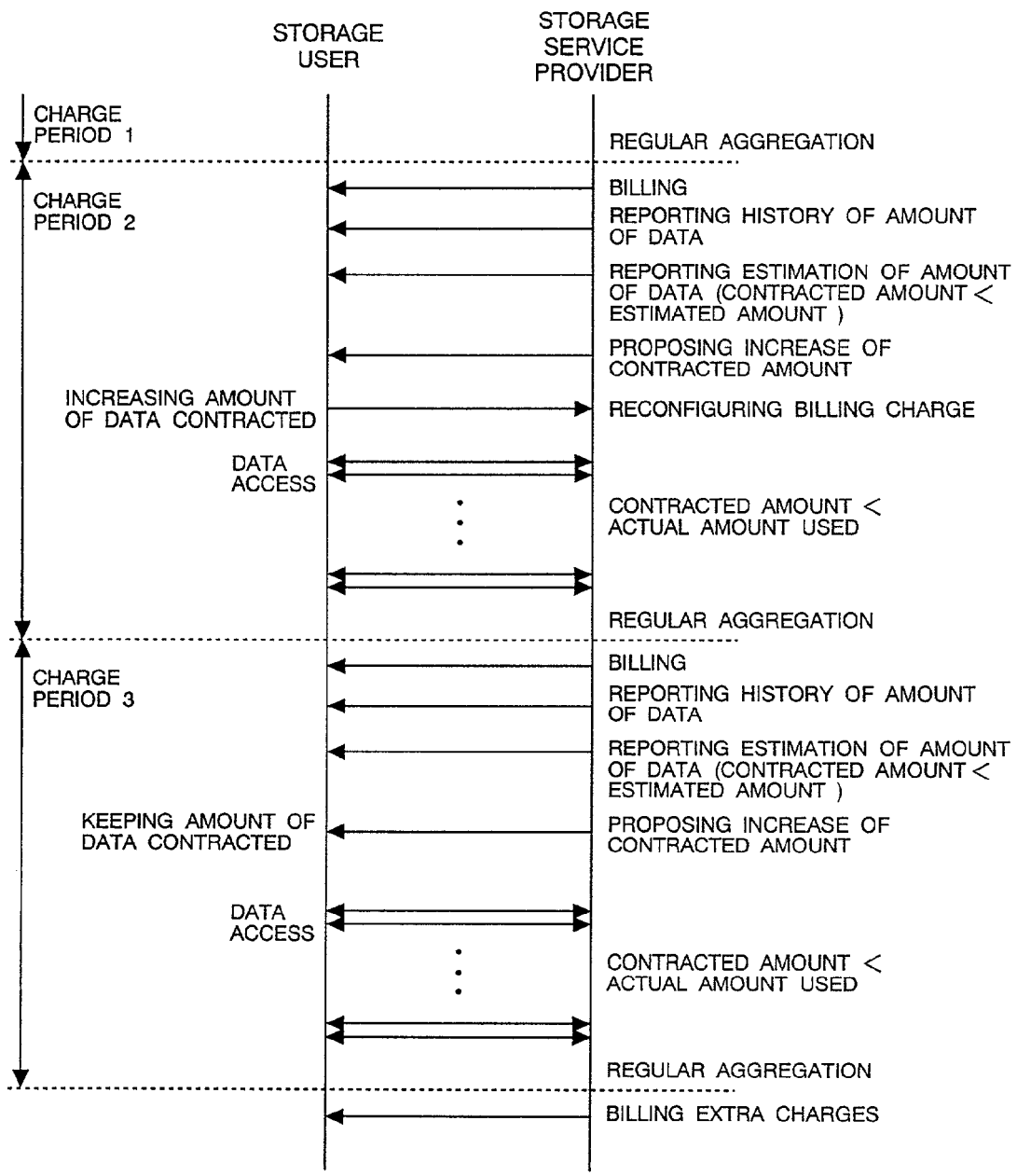
FIG. 32 is a schematic pattern diagram of process sequence performed between a rental storage service user and the rental storage service provider in the rental storage service (third part)

In the process depicted in FIG. 32, as shown by the charge period 2, the rental storage service provider will report the proposition of recommended contract to the rental storage service user in addition to reporting the estimated amount of data. When the rental storage service user will renew the contract according to the recommendation, if the actual usage of data exceeds the contracted amount, the storage space beyond the contracted capacity is allowed to be used by the user, and furthermore the user will be charged as has been contracted.

As shown by the charge period 3, in case in which the rental storage service user does not renew the contract accordingly, and if the actual usage exceeds the contracted capacity, then the provider will charge the user more than the contract made. Or optionally, it may be possible for the rental storage service provider to refuse the use of storage by the rental storage service provider if the usage amount of data exceeds the contracted amount of data.

Figure 33:
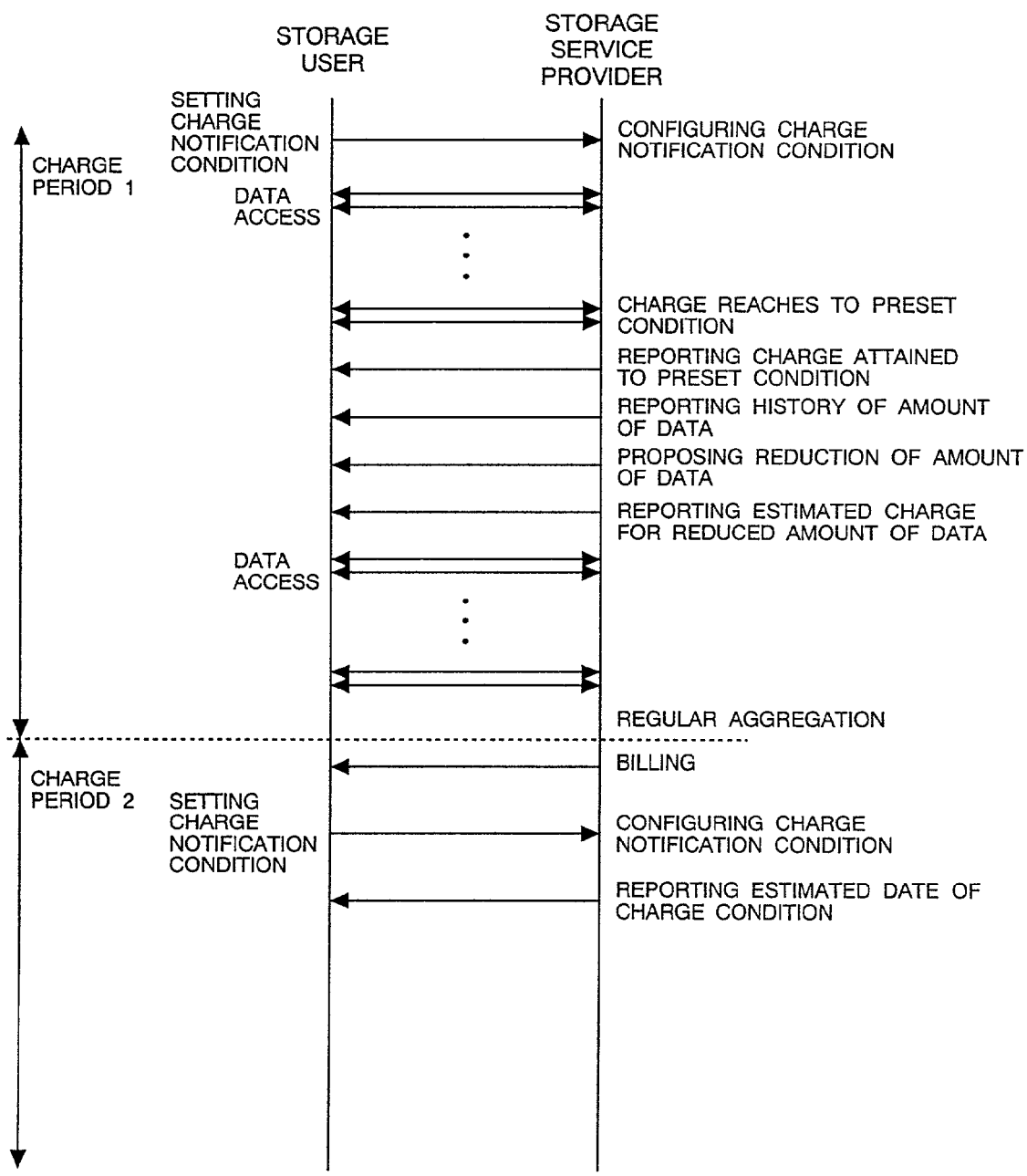
FIG. 33 is a schematic pattern diagram of process sequence performed between a rental storage service user and the rental storage service provider in the rental storage service (fourth part)
Figure 34:
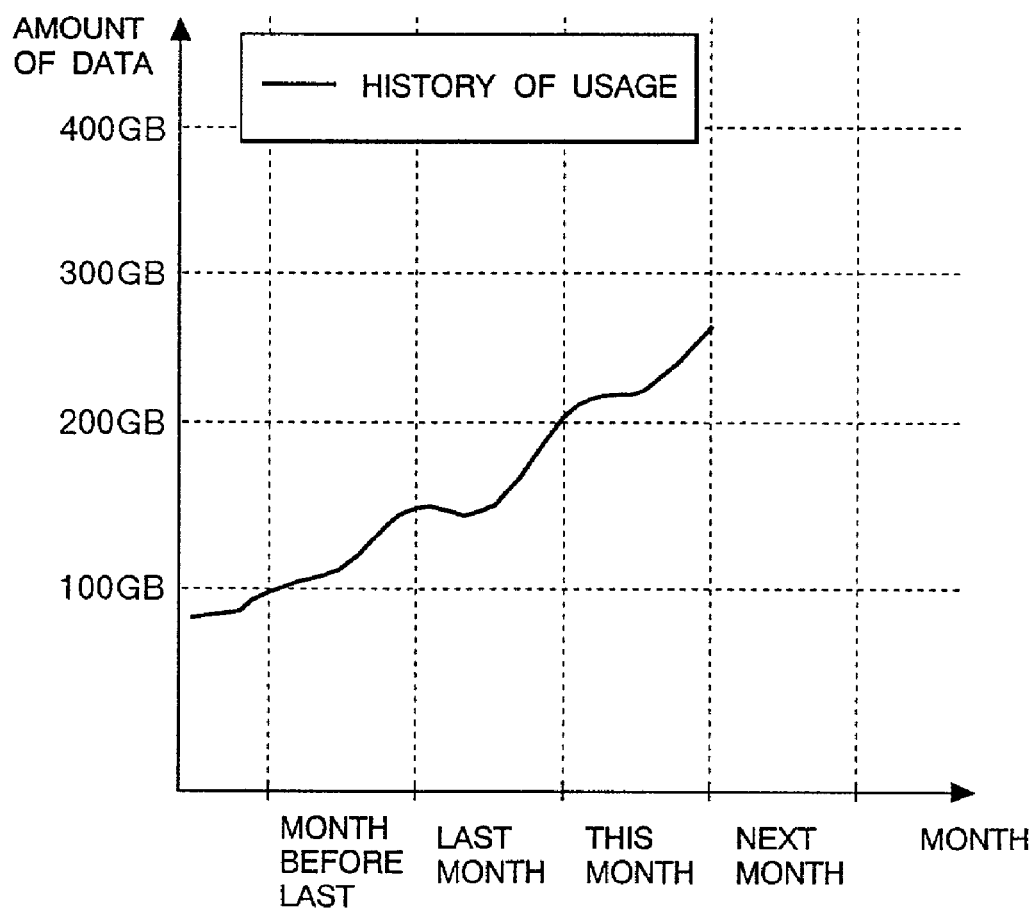
FIG. 34 is a graph chart illustratively indicative of the history of usage record in accordance with the Prior Art.

In the process depicted in FIG. 33, the date will be forecasted at which the predetermined charge will be reached to report the rental storage service user in advance.

According to this process, the rental storage service provider will recommend reduction of total amount of data to the rental storage service user and will project a charge plan when the user will delete the recommended amount of data.

It is further understood by those skilled in the art that the foregoing description is preferred embodiments of the disclosed method and system, and that various changes and modifications may be made in the invention without departing from the spirit and scope thereof.

[Effect of the Invention]

In brief, in accordance with the present invention, when a rental storage service provider provides a rental storage for rental storage service users, a service method of rental storage may be provided, which allows ideal use of storages in correspondence with the billing charge to the users by proposing the most optimum contract conditions to the users, and which allows suppressing the management cost of the users.

Furthermore, the present invention may provide a service method of rental storage, which allows the rental storage service provider providing the rental storage service to effectively reduce the management cost of storage systems as well.

The foregoing description of the preferred embodiments of the invention has been presented for purposes of illustration and description. It is not intended to be exhaustive or to limit the invention to the precise form disclosed, and many modifications and variations are implicitly possible in light of the above teachings or may be acquired from the practice of the invention. The preferred embodiments chosen and described herein in order to explain the principles of the present invention and its practical application to enable the ordinary one skilled in the art to utilize the present invention in various embodiments and with various modifications as are suited to the particular use contemplated. it is intended therefore that the scope of the invention be defined by the claims appended hereto, and their equivalents.

What is claimed is:

1. A service method of a rental storage, in which rental storage users use the rental storage provided by a storage provider on a network and each of said rental storage users and said storage provider communicate with respect to rental storage service, comprising the steps of:

electronically establishing a contract between said storage provider and each of the rental storage users thereby allowing using storage of said storage provider by each of the rental storage users;

calculating by the storage provider an estimation of a data amount in the rental storage for future storage usage of each of said rental storage user, based on the history of storage usage of each of said rental storage user;

showing by the storage provider conditions of said contract including a contracted billing method, a contracted billing period, a contracted storage data amount, a notification threshold storage data amount for triggering contracted notification to each of said rental storage users prior to reaching the storage data amount, and an indication of whether an estimation option is available in said contract for changing the conditions of said contract based upon the estimation, and the estimation to each of said rental storage users; and electronically re-configuring the conditions of said contract as changed by each of said rental storage users if the estimation option is available in said contract, wherein said users are human users having capacity to make contracts and pay bills charged to said human users.

2. A service method of a rental storage, in which rental storage users use the rental storage provided by a rental storage service provider on a network and each of said rental storage service users and said rental storage service provider communicate with respect to rental storage service, comprising the steps of:

electronically making a contract between said rental storage service provider and each of said rental storage service users so as to configure contract conditions based on the contract of use of storage service thereby allowing using storage of said rental storage service provider by each of the rental storage service users;

reporting a charge to each of the rental storage service users by the rental storage service provider;

paying the charge for the use of said storage by each of the rental storage service users to the rental storage service provider;

calculating by the storage provider an estimation of a data amount in the rental storage for future storage usage of each of said rental storage user, based on the history of storage usage of each of said rental storage user;

showing by the storage provider said contract conditions and the history of storage usage record to each of the rental storage service users; and electronically reconfiguring by said rental storage service provider said contract conditions as changed by each of said rental storage users if an estimation option is available in said contract, wherein said contract conditions include a billing method, a billing period, a storage data amount, a notification threshold storage data amount for triggering contracted notification to each of said rental storage users prior to reaching the storage data amount, rental storage estimation, and whether an estimation option is available for changing said contract conditions based upon the rental storage estimation, and said users are human users having capacity to make contracts and pay bills charged to said human users.

3. A service method of a rental storage set forth in claim 2, further comprising the steps of:

proposing by said rental storage service provider a reduction plan of the amount of data of storage usage used by each of said rental storage service users; and reducing the amount of data of storage usage used by each of said rental storage service users in accordance with the recommended reduction plan of data, wherein the step of reconfiguring said contract conditions is performed after the step of proposing by said rental storage service provider and the step of reducing the amount of data of storage usage used by each of said rental storage service users.

4. A service method of a rental storage set forth in claim 3, in which: when each of said rental storage service users deletes data in use in accordance with the recommended reduction plan of the amount of data of storage usage, said rental storage service provider duplicates on a portable medium a backup copy of the data specified to delete by each of said rental storage service users; and said rental storage service provider sends the backup copy of the data to each of the rental storage service users.

5. A service method of a rental storage, in which rental storage users use the rental storage provided by a rental storage service provider on a network and each of said rental storage service users and said rental storage service provider communicate with respect to rental storage service, comprising the steps of:

electronically establishing a first contract between said storage provider and each of the rental storage users thereby allowing using storage of said storage provider by each of the rental storage users;

estimating by said rental storage service provider amount of data of storage usage in the future based or the history of amount of data of storage usage by each of said rental storage service users;

showing by the storage provider conditions of said first contract including a contracted billing method, a contracted billing period, a contracted storage data amount, a notification threshold storage data amount for triggering contracted notification to each of said rental storage users prior to reaching the storage data amount, and an indication of whether an estimation option is available in said first contract for changing the conditions of said first contract based upon the estimation, proposing by the storage provider to each of said rental storage service users a recommended contract on an amount of data according to the estimation if the estimation option is available in said first contract, and electronically re-configuring the conditions of said contract as changed by each of said rental storage users if the estimation option is available in said contract, wherein said users are human users having capacity to make contracts and pay bills charged to said human users.

6. A service method of a rental storage set forth in claim 3, in which: the step of proposing to each of said rental storage service users a recommended contract on the amount of data include the substep of: proposing reduction of amount of data contracted for the storage usage if the storage usage estimated is less than the currently contracted storage usage.

7. A service method of a rental storage set forth in claim 5, in which:

when each of said rental storage service users updates said contract conditions in accordance with a desirable amount of data of storage usage recommended by said rental storage service provider, if the amount of data of storage usage by each of said rental storage service users exceeds the contracted amount of data for storage usage reconfigured within the contract period of the contract, each of said rental storage service users will be allowed using the storage service for the data beyond the contracted amount of said storage usage.

* * * * *